(12) United States Patent
Liu et al.

(10) Patent No.: US 10,803,168 B2
(45) Date of Patent: *Oct. 13, 2020

(54) RENDERING AN OBJECT USING MULTIPLE VERSIONS OF AN APPLICATION IN A SINGLE PROCESS FOR DYNAMIC MALWARE ANALYSIS

(71) Applicant: Palo Alto Networks, Inc., Santa Clara, CA (US)

(72) Inventors: Jiangxia Liu, Cupertino, CA (US); Bo Qu, Fremont, CA (US); Tao Yan, Santa Clara, CA (US); Zhanglin He, San Jose, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/573,810

(22) Filed: Sep. 17, 2019

(65) Prior Publication Data
US 2020/0012781 A1    Jan. 9, 2020

Related U.S. Application Data

(63) Continuation of application No. 15/199,875, filed on Jun. 30, 2016, now Pat. No. 10,482,239.

(51) Int. Cl.
*G06F 21/53*  (2013.01)
*H04L 29/06*  (2006.01)

(52) U.S. Cl.
CPC .......... *G06F 21/53* (2013.01); *H04L 63/0254* (2013.01); *H04L 63/0263* (2013.01); *G06F 2221/033* (2013.01)

(58) Field of Classification Search
CPC .......... G06F 21/50; G06F 21/52; G06F 21/53; G06F 21/564; G06F 21/566;
(Continued)

(56) References Cited

U.S. PATENT DOCUMENTS 9,413,774 B1    8/2016  Liu
10,587,647 B1 *  3/2020  Khalid ................ G06F 9/45558
(Continued)

FOREIGN PATENT DOCUMENTS

| WO | 2012092251 | 7/2012 |
| WO | 2012092252 | 7/2012 |
| WO | 2013067505 | 5/2013 |

OTHER PUBLICATIONS

Ford et al., Analyzing and Detecting Malicious Flash Advertisements, 2009, Computer Security Applications Conference.
(Continued)

*Primary Examiner* — Amir Mehrmanesh
(74) *Attorney, Agent, or Firm* — Van Pelt, Yi & James LLP

(57) ABSTRACT

Techniques for rendering an object using multiple versions of an application in a single process for dynamic malware analysis are disclosed. In some embodiments, a system, process, and/or computer program product for rendering an object using multiple versions of an application in a single process for dynamic malware analysis includes receiving a sample at a cloud security service, in which the sample includes an embedded object; detonating the sample using a browser executed in an instrumented virtual machine environment; and rendering the embedded object using a plurality of versions of an application in a single process during a dynamic malware analysis using the instrumented virtual machine environment.

20 Claims, 10 Drawing Sheets

(58) Field of Classification Search
CPC ..... G06F 21/567; G06F 21/568; H04L 63/14; H04L 63/1408
See application file for complete search history.

(56) References Cited

U.S. PATENT DOCUMENTS

| | | |
|---|---|---|
| 2010/0180344 A1 | 7/2010 | Malyshev |
| 2012/0079596 A1 | 3/2012 | Thomas |
| 2012/0110174 A1 | 5/2012 | Wootton |
| 2012/0304244 A1 | 11/2012 | Xie |
| 2014/0331119 A1 | 11/2014 | Dixon |
| 2015/0096022 A1 | 4/2015 | Vincent |
| 2018/0205754 A1* | 7/2018 | North ................... H04L 63/1433 |

OTHER PUBLICATIONS

Rajab et al., Trends in Circumventing Web-Malware Detection, Google Technical Report, Jul. 2011.

* cited by examiner

US 10,803,168 B2

RENDERING AN OBJECT USING MULTIPLE VERSIONS OF AN APPLICATION IN A SINGLE PROCESS FOR DYNAMIC MALWARE ANALYSIS

CROSS REFERENCE TO OTHER APPLICATIONS

This application is a continuation of co-pending U.S. patent application Ser. No. 15/199,875 entitled RENDERING AN OBJECT USING MULTIPLE VERSIONS OF AN APPLICATION IN A SINGLE PROCESS FOR DYNAMIC MALWARE ANALYSIS filed Jun. 30, 2016 which is incorporated herein by reference for all purposes.

BACKGROUND OF THE INVENTION

A firewall generally protects networks from unauthorized access while permitting authorized communications to pass through the firewall. A firewall is typically a device or a set of devices, or software executed on a device, such as a computer, that provides a firewall function for network access. For example, firewalls can be integrated into operating systems of devices (e.g., computers, smart phones, or other types of network communication capable devices). Firewalls can also be integrated into or executed as software on computer servers, gateways, network/routing devices (e.g., network routers), or data appliances (e.g., security appliances or other types of special purpose devices).

Firewalls typically deny or permit network transmission based on a set of rules. These sets of rules are often referred to as policies. For example, a firewall can filter inbound traffic by applying a set of rules or policies. A firewall can also filter outbound traffic by applying a set of rules or policies. Firewalls can also be capable of performing basic routing functions.

BRIEF DESCRIPTION OF THE DRAWINGS

Various embodiments of the invention are disclosed in the following detailed description and the accompanying drawings.

DETAILED DESCRIPTION

Figure 1:
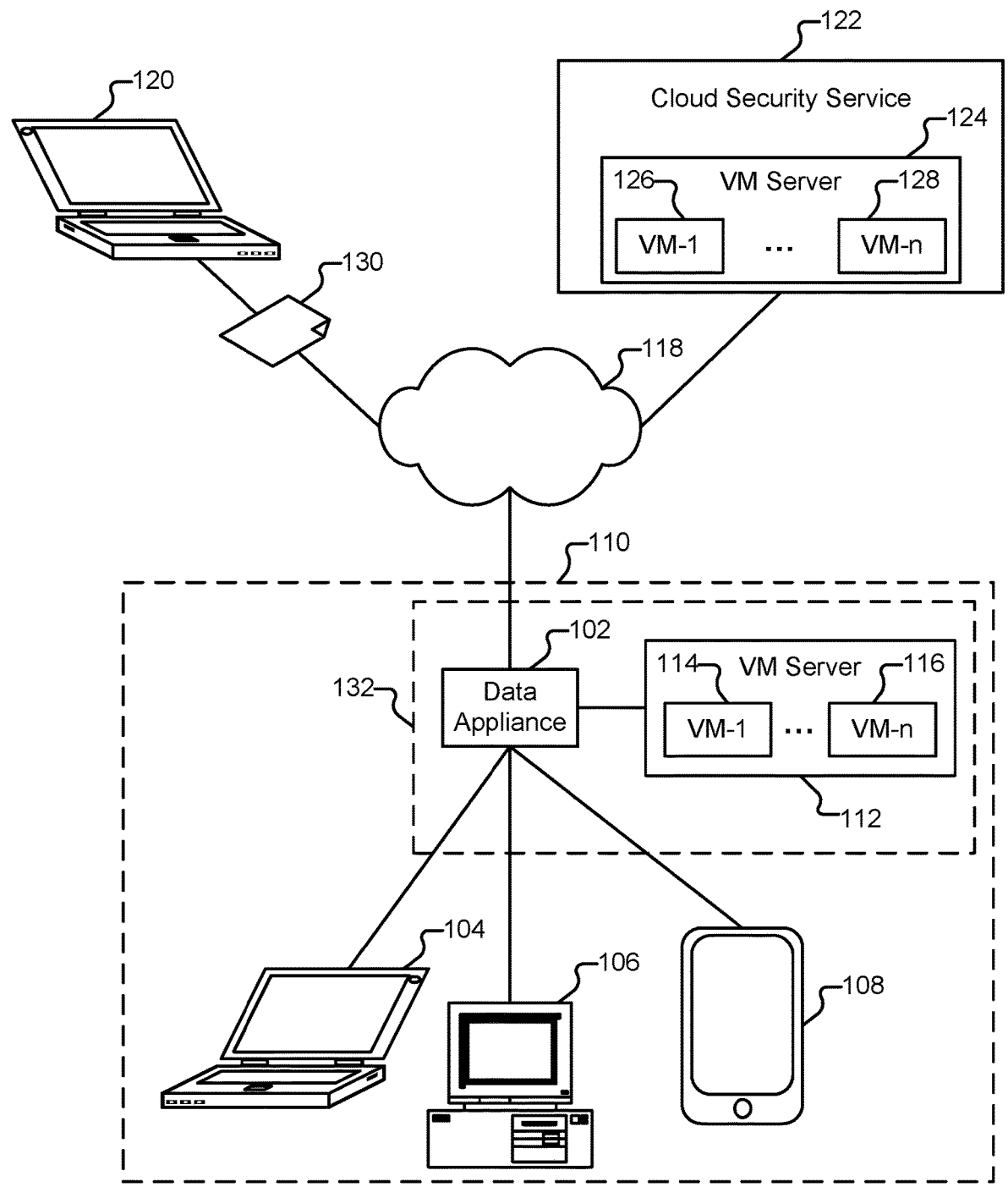
FIG. 1 is a functional diagram of an architecture for providing detection of malware by performing dynamic malware analysis using an instrumented virtual machine environment in accordance with some embodiments.

The invention can be implemented in numerous ways, including as a process; an apparatus; a system; a composition of matter; a computer program product embodied on a tangible, computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as software applications on various types of devices or security devices, such as computer servers, gateways, network/routing devices (e.g., network routers), or data appliances (e.g., security appliances or other types of special purpose devices).

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as described herein).

Security devices (e.g., security appliances, security gateways, security services, and/or other security devices) can include various security functions (e.g., firewall, anti-malware, intrusion prevention/detection, proxy, and/or other security functions), networking functions (e.g., routing, Quality of Service (QoS), workload balancing of network related resources, and/or other networking functions), and/or other functions. For example, routing functions can be based on source information (e.g., IP address and port), destination information (e.g., IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., using application layer filtering firewalls or second generation firewalls, which work on the application level of the TCP/IP stack). Application layer filtering firewalls or application firewalls can generally identify certain applications and protocols (e.g., web browsing using Hyper-Text Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform stateful-based packet inspection in which each packet is examined within the context of a series of packets associated with that network transmission's flow of packets/packet flow (e.g., stateful firewalls or third generation firewalls). This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content. In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls).

For example, Palo Alto Networks' next generation firewalls enable enterprises to identify and control applications, users, and content—not just ports, IP addresses, and packets-using various identification technologies, such as the following: APP-ID (e.g., App ID) for accurate application identification, User-ID for user identification (e.g., by user or user group), and Content-ID for real-time content scanning (e.g., controls web surfing and limits data and file transfers). These identification technologies allow enterprises to securely enable application usage using business-relevant concepts, instead of following the traditional approach offered by traditional port-blocking firewalls. Also, special purpose hardware for next generation firewalls implemented, for example, as dedicated appliances generally provide higher performance levels for application inspection than software executed on general purpose hardware (e.g., such as security appliances provided by Palo Alto Networks, Inc., which utilize dedicated, function specific processing that is tightly integrated with a single-pass software engine to maximize network throughput while minimizing latency).

Dynamic Analysis for Advanced Threats and Unknown Malware

A significant challenge for security detection techniques is to identify threats (e.g., malware, which refers to malicious programs, such as programs attempting to perform malicious or undesired actions) attempting to use new exploits, such as zero-day threats that have not previously been identified (e.g., targeted and/or unknown threats). For example, a new zero-day threat and/or an advanced threat, such as an Advanced Persistent Threat (APT) (e.g., various techniques using malware to exploit vulnerabilities in systems and often using an external command and control (C&C) for continuously monitoring and extracting data from a specific target, often using stealthy, persistent methods that can evade traditional security measures, such as signature-based malware detection measures) that has not previously been identified (e.g., for which no signature yet exists) can exploit new or unresolved vulnerabilities in an application or operation system of a device (e.g., a client device, a server, an appliance, a networking device, a printer, and/or other types of computing devices).

In particular, modern attackers are increasingly using targeted and/or new unknown variants of malware to avoid detection by traditional security solutions. For example, advanced security threats (e.g., advanced cyber-attacks) are employing stealthy, persistent methods to evade traditional security measures. Skilled adversaries (e.g., hackers) demand that modern security teams re-evaluate their basic assumptions that traditional intrusion prevention systems, antivirus, and single-purpose sandbox appliances are up to the task of defeating advanced security threats, such as APTs.

To address this, new and improved techniques are needed to efficiently and effectively identify such new and evolving advanced threats. For example, by executing suspect files (e.g., malware samples, also referred to as samples) in a virtual environment (e.g., an instrumented virtual environment/instrumented virtual machine (VM) environment, which is sometimes also referred to as using a sandbox analysis of samples that can be instrumented with various user level and/or kernel level hooks for monitoring behaviors of programs executing and/or monitoring various network activities, which can be unknown threats) and observing their behavior, such malware can be quickly and accurately identified, even if the malware sample has not been previously analyzed and detected.

Once a sample is deemed malicious (e.g., a sample is deemed to be malware), protections can be automatically generated using, for example, a cloud security service (e.g., implementing a dynamic security analysis of samples in a scalable cloud-based, virtual environment to directly observe the behavior of potentially malicious malware and exploits) to be delivered to subscribers of the cloud security service (e.g., within minutes or hours of detection). For example, such techniques can also be used to forensically determine who/what was targeted, including the application used in the delivery, any Uniform Resource Locator addresses (URLs) that were part of the attack (e.g., URL signatures can be automatically generated and/or other malware signatures can be generated, such as DNS signatures, file-based signatures, etc.), and/or other aspects (e.g., when an unknown threat is discovered, techniques disclosed herein can automatically generate protections to block the threat across the cyber kill-chain, sharing these updates with subscribers of the cloud security service within minutes or hours of detection, such that these quick updates can stop rapidly spreading malware, as well as identify and block the proliferation of potential future variants without any additional action or analysis).

As disclosed herein, the cloud security service identifies unknown malware, zero-day exploits, and/or Advanced Persistent Threats (APTs) by directly executing them in a scalable cloud-based, virtual sandbox environment (e.g., an instrumented virtual environment (also referred to herein as a virtual machine (VM) environment), which is provided by commercially available cloud security services, such as WildFire™ offered by Palo Alto Networks, Inc., which provides for dynamic analysis to identify and block unknown threats, including APT prevention). In one embodiment, the cloud security service automatically creates and disseminates protections in near real-time to help security teams meet the challenge of advanced security threats. In an example implementation, the cloud security service extends the next-generation firewall platform that natively classifies all traffic across many different applications, and the cloud security service can apply a behavioral analysis regardless of ports or encryption, including full visibility into web traffic (e.g., HTTP traffic), email protocols (e.g., SMTP, IMAP, and POP protocols), FTP, SMB, and/or other protocols to facilitate detection and dissemination protections in near real-time to respond to such previously unknown malware and/or new advanced security threats.

Technical Challenges Exist for Efficiently and Accurately Performing Malware Analysis of Samples Detection of malware using an instrumented virtual machine environment can be costly in terms of required computing resources (e.g., including processor and memory usage and computing time) used to perform dynamic security analysis using such an instrumented virtual machine environment. For example, a cloud security service can generally receive a large number of URL samples for processing to perform dynamic malware analysis of each of the URL samples (e.g., received from security/firewall appliances or other devices of customers/subscribers of the cloud security service), which presents new and challenging technical problems to be able to efficiently and accurately perform dynamic malware analysis of large numbers of URL samples using an instrumented VM environment. For instance, a processing time and resource usage for the instrumented VM environment can be efficiently allocated in order to scale to efficiently process such URL samples while also providing sufficient allocation to accurately perform such malware analysis for each of the URL samples, such as further described below.

For example, a new zero-day threat and/or other unknown malware that has not previously been identified (e.g., for which no signature yet exists) can exploit new or unresolved vulnerabilities in an application or operation system of a device (e.g., a client device, a server, an appliance, a networking device, a printer, and/or other types of computing devices). Such threats/malware can be delivered via resources (e.g., web pages) accessible via a network (e.g., the Internet, such as via the World Wide Web) through a browser accessing a Uniform Resource Locator (URL). A URL generally includes a reference, such as a network address, to a resource that can be retrieved using a browser (e.g., a web browser, such as Microsoft Internet Explorer®, Google Chrome®, and/or Apple Safari®), and in some cases, the resource includes executable content or links/URLs to other content that can include executable content (e.g., programs, such as scripts or other programs) that can be malware or facilitate delivery of malware. A cloud security service, such as described herein, can implement an instrumented virtual machine (VM) environment to execute a browser that can be monitored while rendering a given URL sample to perform malware analysis of the URL sample in the instrumented VM environment using various techniques described herein.

However, dynamic malware analysis for samples can require executing multiple processes to open the sample using different versions of an application (e.g., the application is selected based on the file/content type associated with or embedded in the sample, such as Adobe Flash Player for flash content, Adobe Acrobat for PDF content, etc.). For example, existing approaches to performing dynamic malware analysis typically open a web browser or application (e.g., Flash Player for flash objects, Adobe Acrobat for PDF objects, etc.) to execute each version of the application for a given sample to perform dynamic analysis of the sample in a virtual machine environment (e.g., a sandbox environment) with respect to such different application versions (e.g., testing several different versions of the application when opening the content, such as Flash Player versions 13, 16, and/or 17). Thus, existing approaches for performing dynamic security analysis are expensive and inefficient from a computational resources perspective.

Thus, what are needed are new and improved virtual machine (VM) techniques for efficiently and accurately processing samples for dynamic malware analysis to determine whether a given sample is malware or is associated with malware.

Overview of Techniques for Rendering an Object Using Multiple Versions of an Application in a Single Process for Dynamic Malware Analysis Accordingly, various techniques for rendering an object using multiple versions of an application in a single process for dynamic malware analysis are disclosed. The disclosed techniques can facilitate efficient and enhanced malware detection using dynamic malware analysis as will be further described below.

As discussed above, existing approaches for performing dynamic security analysis are expensive and inefficient from a computational resources perspective. In contrast, the disclosed techniques facilitate testing several different application versions in a single process (e.g., opening/executing the content using different versions of an application, such as Adobe Flash Player for flash content, Adobe Acrobat for PDF content, etc.). As a result, the disclosed techniques provide enhanced performance of dynamic testing of samples for malware analysis by performing the analysis in a single process.

Specifically, various techniques described herein can more efficiently perform detection of malware using an instrumented virtual machine (VM) environment (e.g., a sandbox environment), such as by more efficiently using computing resources, including processor, memory usage, and/or computing time, used to perform dynamic security analysis using such an instrumented VM environment. In addition, these techniques described herein can also provide an enhanced detection rate of malware using an instrumented VM environment that is performed more efficiently to accurately detect new and/or unknown malware, such as new/unknown URL samples, as further discussed below.

More specifically, various techniques described herein can more efficiently perform detection of malware using an instrumented VM environment by rendering an object using multiple versions of an application in a single process for dynamic malware analysis, which improves the computing efficiency for performing the dynamic malware analysis. As such, the disclosed techniques can utilize less processor and/or memory computing resources for performing the dynamic malware analysis for each sample.

In some embodiments, the disclosed techniques provide new and improved techniques for rendering an object with different versions of an application. For example, the disclosed techniques can render an object (e.g., content) included in and/or embedded in a sample (e.g., a malware sample, such as a URL sample for a web page that has embedded content in the web page) that can be rendered using a single process (e.g., a browser process, such as a single Microsoft Internet Explorer (IE) process, a single Google Chrome process, or a single Mozilla Firefox process), which calls an external application to render the object.

Accordingly, various techniques for performing malware analysis of a sample (e.g., a malware sample, such as a URL sample and/or a sample that includes content for analysis) using a browser executed in an instrumented virtual machine environment are disclosed. For example, techniques described herein can be used to provide more efficient malware analysis of samples using a browser executed in an instrumented VM environment (e.g., a more efficient use of computing resources).

Various techniques for performing malware analysis of one or more samples using a browser executed in an instrumented virtual machine environment are disclosed. In one embodiment, a system, process, and/or computer program product for rendering an object using multiple versions of an application in a single process for dynamic malware analysis further includes an instrumented virtual machine environment executed on a processor that receives a sample for dynamic malware analysis using a browser executed in the instrumented virtual machine environment for performing the dynamic malware analysis of the sample using the browser executed in the instrumented virtual machine environment, and the sample is rendered using the browser executed in a single process in the instrumented virtual machine environment and monitored using the instrumented virtual machine environment (e.g., for a (predetermined) period of time allocated for performing the dynamic malware analysis of the sample and/or until a malware determination based on the dynamic malware analysis, such as for at least the period of time allocated for performing the dynamic malware analysis of the sample or until malicious behavior is detected).

In some embodiments, a system, process, and/or computer program product for rendering an object using multiple versions of an application in a single process for dynamic malware analysis includes receiving a sample at a cloud security service, in which the sample includes an embedded object; detonating the sample using a browser executed in an instrumented virtual machine environment; and rendering the embedded object using a plurality of versions of an application in a single process during a dynamic malware analysis using the instrumented virtual machine environment. For example, a sample that provides a URL/link to a web page that includes an embedded object (e.g., for Flash content or other content) can be rendered using a browser and multiple different versions of an external application (e.g., Adobe Flash Player for playing Flash content or a different application for opening/executing other types of content) in a single process during the dynamic malware analysis in the instrumented virtual machine environment.

In one embodiment, a system, process, and/or computer program product further includes modifying the instrumented virtual machine environment to support execution of the plurality of versions of the application. For example, modifying the instrumented virtual machine environment can include hot patching a baseline VM image (e.g., including adding a new class id and a type for each of the added plurality of versions of the application in a registry; and/or modifying a physical executable file for each of the plurality of versions of the application on disc or patch in memory to facilitate co-rendering of the embedded object using the plurality of versions of the application) to support additional versions of one or more external applications, such as further described below.

In one embodiment, a system, process, and/or computer program product further includes generating a web page that adds (e.g., embeds) objects to call content of the sample (e.g., a Flash file(s), a PDF file(s), and/or other content) in a template web page (e.g., HTML file), such as further described below.

In one embodiment, a system, process, and/or computer program product further includes determining whether the sample is associated with malware based on analysis of the sample during a period of time allocated for performing the dynamic malware analysis of the sample using the browser executed in the instrumented virtual machine environment.

In one embodiment, a system, process, and/or computer program product further includes a browser helper object (BHO) that is executed (e.g., a browser library, such as a dynamically linked library (DLL) that is loaded or installed as a browser plugin) by the browser prior to rendering the URL sample.

In one embodiment, a system, process, and/or computer program product further includes a BHO that is executed by the browser prior to rendering the URL sample, and the BHO includes an object enumerator component that processes the sample to enumerate each of the objects that can be rendered by the sample (e.g., enumerating objects and embed nodes from a DOM tree in the sample (e.g., an HTML page)) such that the BHO facilitates rendering the embedded object using the plurality of versions of the application in the single process during the dynamic malware analysis using the instrumented virtual machine environment (e.g., to duplicate objects in the malware sample and to request rendering of the objects using each of the plurality of versions of the application) as further described below.

In one embodiment, a system, process, and/or computer program product further includes a BHO that is executed by the browser prior to rendering the URL sample, and the BHO includes a function interceptor component that can intercept/hook functions of interest (e.g., a DllGetClassObject function or other functions) such that the BHO facilitates a determination of how many objects (e.g., Flash files or other objects) are embedded in a web page, and then the disclosed techniques further include duplicating and rendering the same number of such embedded objects using different application versions for rendering such objects (e.g., different versions of the Adobe Flash Player for rendering each of the embedded Flash files) in a single process during the dynamic malware analysis using the instrumented virtual machine environment as further described below.

These and other aspects of the disclosed techniques for rendering an object using multiple versions of an application in a single process for dynamic malware analysis will now be further described below.

Overview of an Architecture for Performing a Dynamic Malware Analysis of Samples Using an Instrumented Virtual Machine Environment FIG. 1 is a functional diagram of an architecture for providing detection of malware by performing dynamic malware analysis using an instrumented virtual machine environment in accordance with some embodiments. For example, such an environment can detect and prevent malware from causing harm (e.g., malicious software can include any executable program, such as active content, executable code, scripts, and/or any other content that can interfere with operation of a computing device or computer network, attempt unauthorized access of data or components of a computing device, and/or perform various other malicious, unauthorized, and/or undesirable activities). In particular, a variety of attempts by a malicious/unauthorized individual (e.g., a hacker) to propagate malware (e.g., malware 130) via system 120 are described, as are techniques for thwarting that propagation or execution of such malware in protected network computing environments, such as for protecting computing devices within an enterprise network 110.

In the example shown in FIG. 1, client devices 104, 106, and 108 are a laptop computer, a desktop computer, and a tablet (respectively) present in an enterprise network 110. Data appliance 102 is configured to enforce policies regarding communications between clients, such as clients 104 and 106, and nodes outside of enterprise network 110 (e.g., reachable via external network 118, such as the Internet). Examples of such policies include ones governing traffic shaping, quality of service, and routing of traffic. Other examples of policies include security policies such as ones requiring the scanning for threats in incoming (and/or outgoing) email attachments, web site downloads (e.g., URLs), files exchanged through instant messaging programs, and/or any other file transfers and/or communications. In some embodiments, appliance 102 is also configured to enforce policies with respect to traffic that stays within enterprise network 110.

Appliance 102 can take a variety of forms. For example, appliance 102 can be a dedicated device or set of devices (e.g., executing a firewall or a virtualized firewall). The functionality provided by appliance 102 can also be integrated into or executed as software on a general purpose computer, a computer server, a gateway, and/or a network/routing device. For example, in some embodiments, services provided by data appliance 102 are instead (or in addition) provided to client 104 by software executing on client 104.

Whenever appliance 102 is described as performing a task, a single component, a subset of components, or all components of appliance 102 may cooperate to perform the task. Similarly, whenever a component of appliance 102 is described as performing a task, a subcomponent may perform the task and/or the component may perform the task in conjunction with other components. In various embodiments, portions of appliance 102 are provided by one or more third parties. Depending on factors such as the amount of computing resources available to appliance 102, various logical components and/or features of appliance 102 may be omitted and the techniques described herein adapted accordingly. Similarly, additional logical components/features can be added to appliance 102 as applicable.

As will be described in more detail below, appliance 102 can be configured to work in cooperation with one or more virtual machine servers (112, 124, or similarly executing an instrumented VM environment on a host device/machine) to perform malware analysis/prevention, including various techniques for performing dynamic malware analysis of samples using a browser executed in an instrumented virtual machine environment as disclosed herein. As one example, data appliance 102 can be configured to provide a copy of malware 130 (e.g., a malware sample, such as a URL sample or a sample that includes additional/other content, which can include or link to potentially malicious content) to one or more of the virtual machine servers for real-time analysis (e.g., dynamic analysis using an instrumented VM environment). As another example, a cloud security service 122 can provide a list of signatures (e.g., signatures can include URL signatures of known-malicious URLs, DNS signatures, file/content signatures, and/or other signatures) to appliance 102 as part of a subscription. Those signatures can be generated by service 122 in conjunction with the techniques described herein. For example, if service 122 identifies a new malware associated with a sample (e.g., malware sample) received from a data appliance (e.g., data appliance 102 or another data appliance), such as using various techniques for performing dynamic malware analysis of samples using a browser executed in an instrumented virtual machine environment as disclosed herein, cloud security service 122 can automatically generate a new signature for the newly identified malware and send the new signature to various subscribers. In this example, data appliance 102 and various other data appliances can receive subscription-based signature updates, such as for malware detected in URL samples that can be used to generate new URL signatures (e.g., malware URLs), that can then be applied by the data appliance(s) to block and/or perform other actions for network traffic associated with any such malware URLs based on a policy, such as a firewall policy.

An example of a virtual machine server is a physical machine comprising commercially available server-class hardware (e.g., a multi-core processor such as a dual 6-core Intel® processor with Hyper-Threading, 4 or more Gigabytes of RAM such as a 128 GB RAM, a system disk such as a 120 GB SSD, and one or more Gigabit network interface adapters) that executes commercially available virtualization software, such as VMware ESXi, Citrix XenServer, or Microsoft Hyper-V (e.g., such a VM environment can emulate the Windows® XP operating system environment using the dual 6-core Intel® processor with Hyper-Threading and 512 MB of RAM, the Windows® 7 operating system environment using the dual 6-core Intel® processor with Hyper-Threading and 1 GB of RAM, and/or other operating system environments and/or using different hardware capacity/components). The virtual machine servers may be separate from, but in communication with, data appliance 102, as shown in FIG. 1. A virtual machine server may also perform some or all of the functions of data appliance 102, and a separate data appliance 102 is omitted as applicable. Further, a virtual machine server may be under the control of the same entity that administers data appliance 102 (e.g., virtual machine server 112); the virtual machine server may also be provided by a third party (e.g., virtual machine server 124, which can be configured to provide services to appliance 102 via third party/cloud security service 122). In some embodiments, data appliance 102 is configured to use one or the other of virtual machine servers 112 and 124 for dynamic malware analysis. In other embodiments, data appliance 102 is configured to use the services of both servers (and/or additional servers not shown). Thus, in some implementations, the cloud security service can be delivered either as a public cloud or as a private cloud (e.g., deployed locally on an enterprise network using a locally deployed data appliance or server).

In an example implementation, appliance 102 can be implemented using a commercially available firewall appliance and/or a commercially available virtual firewall solution provided by Palo Alto Networks, Inc., and the cloud security service can be implemented using a commercially available security service, such as the WildFire™ cloud-based malware analysis environment provided by Palo Alto Networks, Inc. (e.g., see www.paloaltonetworks.com/products/technologies/wildfire.html).

In some embodiments, the virtual machine server 124 is configured to implement various emulation-based techniques for performing dynamic malware analysis of a sample using a browser executed in an instrumented virtual machine environment as described herein with respect to various embodiments (e.g., implemented using instrumented VM environments 126 and 128, which can be executed by cloud security service 122 and/or malware analysis system 132, such as described below). For example, the virtual machine server 124 can provide an instrumented virtual machine environment capable of performing the various techniques as described herein. These instrumented virtual machine (VM) environments 126 and 128 can include, for example, various user level hooks and/or kernel level hooks in the emulated execution environment (e.g., using various user level and/or kernel level hooks for monitoring behaviors of programs executing, such as a browser program, and/or monitoring various network activities) to facilitate the monitoring of various program behaviors (e.g., active/executable content and/or content that can be rendered using another (external) application, included in the content, such as a resource accessible via a URL or a web page, such as content that is embedded in a web page of the URL or linked to from the URL) during execution in the VM environment (e.g., instrumented VM environments, such as described herein) and to log such monitored behaviors for analysis based on the various techniques described herein with respect to various embodiments. Also, in some cases, multiple instances of a malware sample (e.g., URL sample) can be performed using multiple VM environments to perform various tests and/or execute using different execution environments (e.g., different versions of an operating system (OS) environment, different versions of an application, for example, different versions of a browser such as Microsoft Internet Explorer® 9, Microsoft Internet Explorer® 10, Microsoft Internet Explorer® 11, etc.).

Example Components of a Data Appliance

Figure 2:
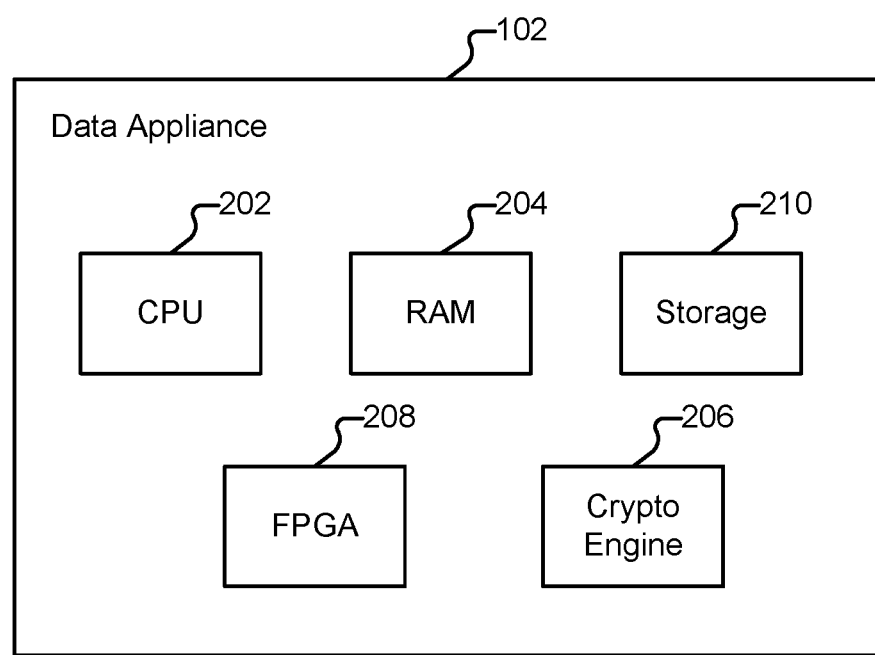
FIG. 2 illustrates a data appliance in accordance with some embodiments.

FIG. 2 illustrates a data appliance in accordance with some embodiments. The example shown is a representation of physical components that are included in data appliance 102, in some embodiments. Specifically, data appliance 102 (e.g., a device that performs various security related functions, such as a security device, which can be in the form of, for example, a security appliance, security gateway, security server, and/or another form of a security device) includes a high performance multi-core CPU 202 and RAM 204. Data appliance 102 also includes a storage 210 (such as one or more hard disks), which is used to store policy and other configuration information. Data appliance 102 can also include one or more optional hardware accelerators. For example, data appliance 102 can include a cryptographic component 206 configured to perform encryption and decryption operations, and one or more FPGAs 208 configured to perform matching (e.g., pattern matching, such as for application identification (App ID) as further described below with respect to FIG. 3), act as network processors, and/or perform other tasks.

Figure 3:
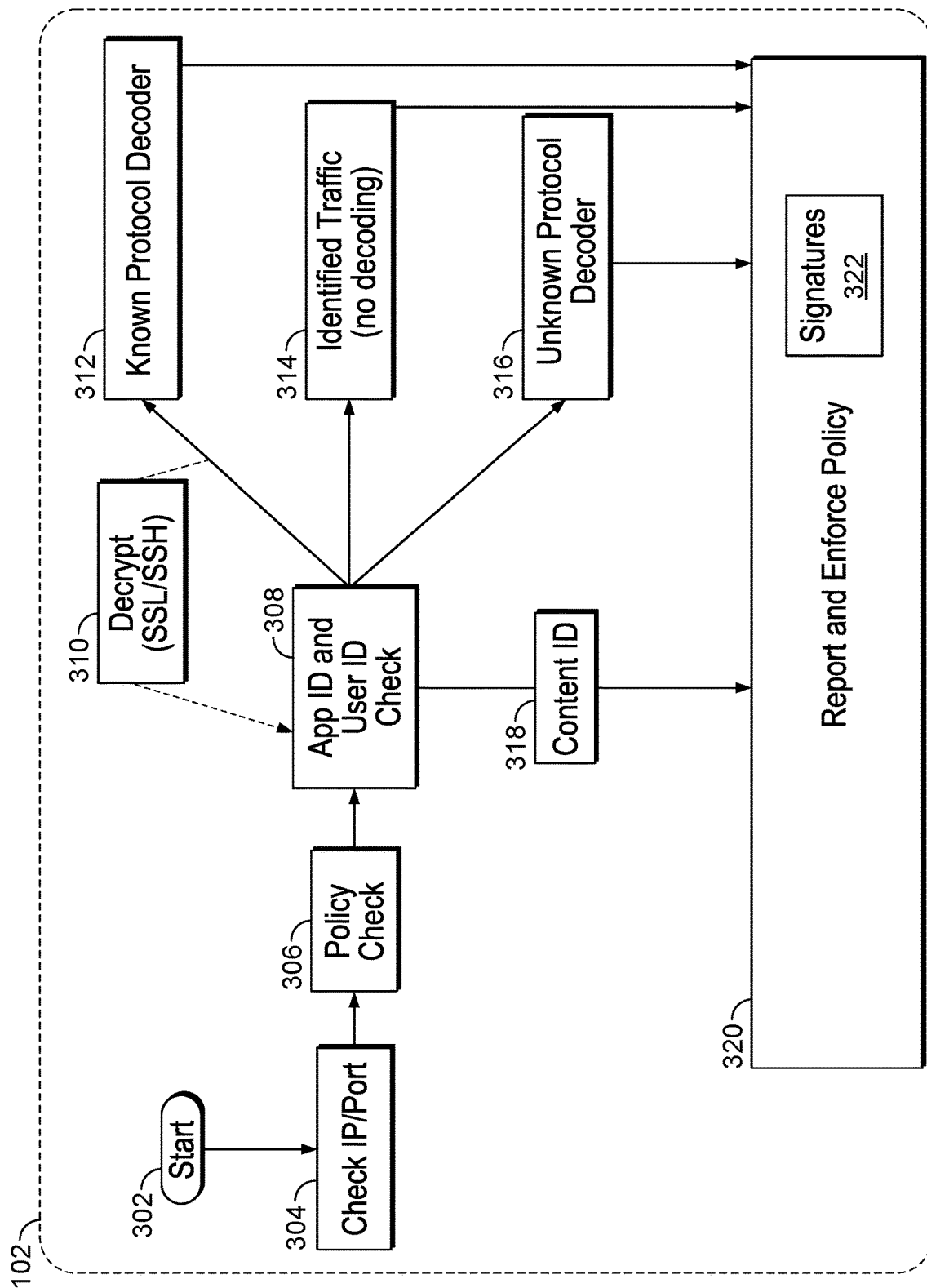
FIG. 3 is a functional diagram of an architecture of a data appliance in accordance with some embodiments.

FIG. 3 is a functional diagram of an architecture of a data appliance in accordance with some embodiments. As shown in FIG. 3, network traffic is monitored at data appliance 102. In one embodiment, network traffic is monitored using a data appliance (e.g., a data appliance that includes security functions, such as a security device/appliance that includes a firewall or a virtual firewall). In one embodiment, network traffic is monitored using a gateway (e.g., a gateway that includes security functions, such as a security gateway/network gateway firewall). In one embodiment, the network traffic is monitored using pass through (e.g., in-line) monitoring techniques.

In one embodiment, network traffic is monitored using a state-based firewall. In one embodiment, the state-based firewall can monitor traffic flows using an application (app) identifier (ID) component (e.g., APP-ID (App ID) engine, shown as App ID Check & User ID Check 308 in FIG. 3). For example, the monitored network traffic can include HTTP traffic, HTTPS traffic, FTP traffic, SSL traffic, SSH traffic, DNS requests, unclassified application traffic (e.g., unknown application traffic), and/or other types of traffic (e.g., traffic using other types of known or unknown protocols).

As shown in FIG. 3, network traffic monitoring begins at 302. An IP address and port component 304 determines an IP address and port number for a monitored traffic flow (e.g., a session) based on packet analysis. A policy check component 306 determines whether any policies can be applied based on the IP address and port number. As also shown in FIG. 3, an App ID Check & User ID Check 308 identifies an application and a user. For example, the application can be identified using an App ID component (308) using various application signatures for identifying applications based on packet flow analysis (e.g., implemented using an FPGA, such as FPGA 208 as shown in FIG. 2). The user identification can also be determined based on a source IP address (e.g., based on one or more IP addresses). In this example, the App ID component (308) can be configured to determine what type of traffic the session involves, such as HTTP traffic, HTTPS traffic, FTP traffic, SSL traffic, SSH traffic, DNS requests, unknown traffic, and various other types of traffic, and such classified traffic can be directed to an appropriate decoder, such as decoders 312, 314, and 316, to process the classified traffic for each monitored session's traffic flow.

As also shown in FIG. 3, if the monitored traffic is encrypted (e.g., encrypted using HTTPS, SSL, SSH, or another known encryption protocol), then the monitored traffic can be decrypted using a decrypt component 310 (e.g., applying trusted man-in-the-middle techniques using a self-signed certificate associated with the network device, such as a data appliance, gateway, or other network device implementing the firewall). A known protocol decoder component 312 decodes and analyzes traffic flows using known protocols (e.g., applying various signatures (322) for the known protocol) and reports the monitored traffic analysis to a report and enforce policy component 320. For example, known protocol decoder component 312 can decode and analyze HTTP/HTTPS traffic flows for applying the disclosed techniques (e.g., applying a generated HTTP cookie signature to detect a malicious HTTP cookie in HTTP traffic and/or applying other malware signatures as further described below). Identified traffic (no decoding required) component 314 reports the identified traffic to the report and enforce policy component 320. An unknown protocol decoder component 316 decodes and analyzes traffic flows (e.g., applying various heuristics) and reports the monitored traffic analysis to the report and enforce policy component 320.

In one embodiment, the results of the various traffic monitoring techniques using known protocol decoder component 312, identified traffic component 314, and unknown protocol decoder component 316 described above are provided to report and enforce policies component 320 (e.g., network/routing policies, security policies, and/or firewall policies). For example, firewall policies can be applied to the monitored network traffic using application identification, user identification, and/or other information to match signatures 322 (e.g., application/APP ID signatures, such as URL signatures, file-based, protocol-based, and/or other types/forms of signatures for detecting malware or suspicious behavior).

As also shown, appliance 102 also includes a content-ID component 318. In one embodiment, the content-ID component's identified content is also used by report and enforce policy component 320, possibly in various combinations with other information, such as application, user, and/or other information, to enforce various security/firewall policies/rules, such as for implementing various dynamic analysis techniques as further described below.

In one embodiment, firewall policies can include a policy to further examine a sample(s) using dynamic malware analysis using the disclosed techniques such as described herein (e.g., using a local VM server 112 and/or a remote VM server of a cloud security service as described above with respect to FIG. 1). For example, a new or unknown URL (e.g., a URL that does not match an existing URL signature) and/or other content (e.g., a PDF file, a Flash (.swf format) file, and/or other content) can be provided as a sample for such further dynamic malware analysis.

In an example implementation, one or more of the components of data appliance 102 (e.g., App and User ID (308) and/or content-ID (318) components) can be implemented to facilitate the disclosed techniques as further described below. As such, FIGS. 1-3 are provided as example environments and example applications that can benefit from implementing the disclosed techniques for rendering an object using multiple versions of an application in a single process for dynamic malware analysis.

Applying Instrumented Virtual Machines to Analyze Samples

An instrumented virtual machine (VM) can be used to perform behavior profiling (e.g., in a VM sandbox environment) using various heuristic-based and/or other malware analysis techniques that can be performed during execution of the program in the instrumented VM environment (e.g., in some cases, in real-time during execution of the program in the instrumented VM environment), such as during a file transfer (e.g., during an active file/attachment download, such as downloading and rendering a web page based on a URL sample) and/or on files previously collected (e.g., a collection of files submitted for batch analysis). Documents, executables, URLs, and other forms of potentially malicious content (e.g., to be evaluated) are referred to herein as "malware samples" or just "samples." Samples generally refer to candidate malware samples that include a Uniform Resource Identifier (URI) (e.g., a URL address) and/or other content and can generally be rendered using an application (e.g., executed using a processor), such as a browser (e.g., a web browser, such as Microsoft Internet Explorer®, Google Chrome, Mozilla Firefox, and/or other commercially available web browsers).

As one example, suppose a user of client 104 attempts to access a web page at a particular URL address using a web browser executed on client 104 by sending a request (e.g., an HTTP request) for the URL. The request for the URL is received (e.g., intercepted) by data appliance 102, which determines whether to filter the URL (e.g., allow, block, and/or perform other actions based on a policy and/or URL signatures) or to send the URL as a sample (e.g., a URL sample) to a virtual machine (VM) server (e.g., VM server 112 or 124), for further analysis (e.g., dynamic malware analysis of the URL sample, based on a policy, using the disclosed techniques as further described below).

In an example implementation, the virtual machine server (e.g., VM server 112 or 124) can be configured to execute a browser that can be used to request and render the URL in a single process in a virtual machine, such as virtual machine 114 or 116 on VM server 112 or virtual machine 126 or 128 on VM server 124 (e.g., an instantiated virtual machine in an instrumented virtual machine environment). In an example implementation of an instrumented virtual machine environment, the virtual machines (e.g., VM instances) may all execute the same operating system (e.g., Microsoft Windows Version 7, Version 8, Version 10, and/or other versions of the Microsoft operating system) or may execute different operating systems or versions thereof (e.g., VM 114 can emulate a Windows operating system and VM 116 can emulate an Android operating system or some other operating system). Observed behaviors resulting from executing a browser and rendering the URL sample (e.g., to analyze various behaviors while rendering the URL sample using the browser in the instrumented VM environment) are logged and analyzed for indications that the URL is potentially malicious or malicious. For example, if attempts to retrieve or link to a known malware URL are detected, then the URL sample can be determined to be malicious. As another example, if certain behaviors are detected when rendering content associated with the URL sample (e.g., downloading and/or opening of suspicious/malicious Flash, PDF, and/or other content), then the URL sample can be determined to be malicious based on various heuristic techniques.

As discussed above, instantiating virtual machine instances for performing analysis of a given sample can be expensive from a computing resources perspective and can also be inefficient from a compute time perspective (e.g., due to the time required to launch an instance of a VM with desired resources as well as due to computing resource usage for such dynamic malware analysis including CPU and memory requirements for executing such VMs on an appliance/server or other computing device). Thus, to improve performance of malware detection using an instrumented virtual machine environment, in some embodiments, various new techniques are disclosed for performing dynamic malware analysis of a sample using a single process in an instrumented virtual machine environment, as further described below.

In some embodiments, such VM-based analysis techniques are performed by a VM server (e.g., VM server 112 or 124, or similarly executing an instrumented VM environment on a host device/machine). In other embodiments, such VM-based analysis techniques are performed at least in part by appliance 102 (e.g., or in some cases, such VM-based analysis techniques can be performed completely by the appliance 102). The malware analysis and enforcement functionality illustrated in FIG. 1 as being provided by data appliance 102 and VM server 112 is also referred to herein as being provided by malware analysis system 132. As explained above, portions of malware analysis system 132 may be provided by multiple distinct devices, but may also be provided on a single platform, as applicable.

If the sample (e.g., file(s), URL(s), embedded URL(s), active/executable or other content associated with the resource accessible via a URL included in or associated with the sample) is determined to be malicious, appliance 102 can automatically perform a responsive action based on a policy, such as to block the URL request/web page download based on the dynamic malware analysis result. Further, in some embodiments, a signature can be generated and distributed (e.g., to appliance 102 and/or other data appliances) to automatically identify such malware, such as to automatically block future URL requests determined to be malicious (e.g., to block known malware URLs and/or block downloads of malware PDF/Flash files or other content).

Techniques for Rendering an Object Using Multiple Versions of an Application in a Single Process for Dynamic Malware Analysis A variety of techniques for rendering an object using multiple versions of an application in a single process for dynamic malware analysis can be performed using the data appliance and cloud security service described above with respect to FIGS. 1-3. These and other aspects of the techniques for rendering an object using multiple versions of an application in a single process for dynamic malware analysis will now be further described below.

Generally, there are different mechanisms for coding in HyperText Markup Language (HTML) instructions to embed objects (e.g., objects can include multimedia or other content, such as audio, video, Java applets, ActiveX, PDF, and Flash) in a web page that are currently supported by various applications for rendering web pages (e.g., browser applications). A first approach utilizes an object tag to define an embedded object within an HTML file/page (e.g., <EMBED> . . . ) (e.g., and is currently supported by Microsoft Internet Explorer (IE) (e.g., IE versions 8 and later)). A second approach utilizes an embed tag to define an embedded object within an HTML file/page (e.g., <OBJECT . . . >) (e.g., and is currently supported by IE as well as other commercially available web browsers, such as Google Chrome and Mozilla Firefox web browsers).

Generic HTML Code to Add Content of a Sample into a Web Page

In some cases, a sample includes content, such as a Flash file or other content files, rather than a URL or web/HTML page/file. In such cases, the disclosed techniques can be similarly applied by generating an HTML file that includes an embedded object for that content. In one embodiment, the disclosed techniques include generating a web page that adds (e.g., embeds) objects to call content of the sample (e.g., a Flash file(s), a PDF file(s), and/or other content) in a template web page (e.g., HTML file), such as further described below.

Below is an example of generic HTML code to add Flash content (e.g., embed a Flash object) into a web page (e.g., an HTML page). The below example includes both an example OBJECT tag and an example EMBED tag.

```
<html>
<body>
<OBJECT    classid="clsid:D27CDB6E-AE6D-11cf-96B8-
444553540000"    WIDTH="320"
HEIGHT="240" id="Yourfilename">
<PARAM NAME=movie VALUE="YOURFILENAMEHERE.swf">
<PARAM NAME=bgcolor VALUE=#333399>
<EMBED    src="Yourfilename.swf"    quality=high
bgcolor=#333399    WIDTH="320" HEIGHT="240"
NAME="Yourfilename" TYPE="application/x-shockwave-flash">
</EMBED>
</OBJECT>
</body>
</html>
```

As will now be apparent, other types of content can be similarly added/embedded into the template web page to facilitate performing the below described techniques for samples that include URL samples or samples of other content (e.g., Flash file(s), PDF file(s), and/or other content), as further described below.

Figure 4:
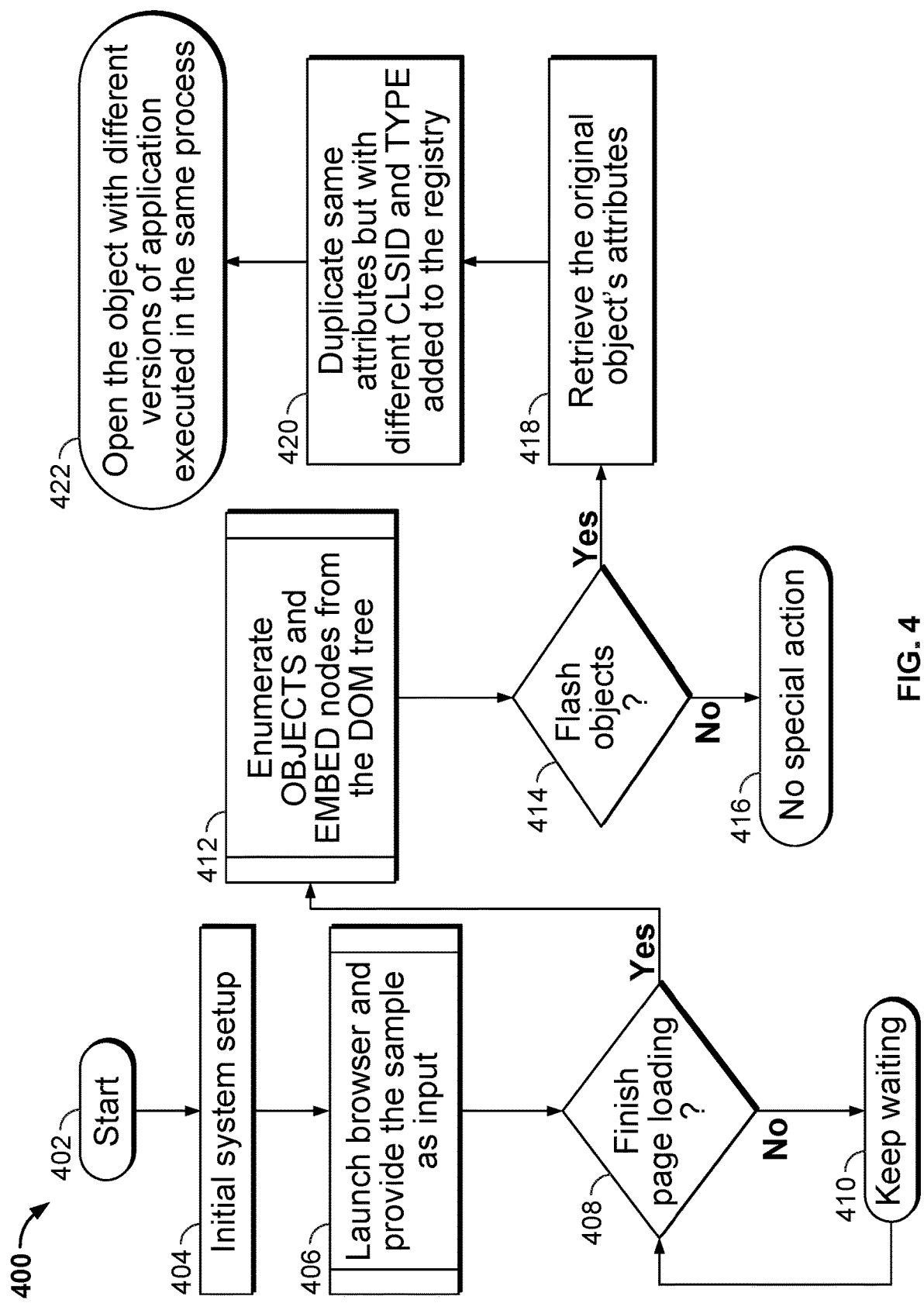
FIG. 4 is a flow diagram for enumerating objects embedded in a sample during dynamic malware analysis of a sample in an instrumented virtual machine environment in accordance with some embodiments.

In one embodiment, techniques for rendering an object using multiple versions of an application in a single process for dynamic malware analysis include enumerating objects in a sample (e.g., coded in a web page using the first mechanism and/or second mechanism) as shown in FIG. 4 and further described in the below section entitled: (1) enumerating objects and embed nodes from a DOM tree.

(1) Enumerating Objects and Embed Nodes from a DOM Tree

In one embodiment, the disclosed techniques include enumerating objects and embed nodes from Document Object Model (DOM) nodes in an HTML page (e.g., an HTML page/file associated with a sample) to determine a list of objects and their attributes. For example, Microsoft Internet Explorer (IE) uses a CLSID registry (e.g., a GUID entry in the Microsoft Windows operating system (OS) registry) to differentiate each object request in a document object model (DOM) (e.g., a DOM of an HTML page, such as for a web page). By copying the attributes and modifying the CLSID of the object, a 'new' object can be inserted into the DOM node tree (e.g., Microsoft IE DOM node tree). If the CLSID of a copied object is mapped to a different version of an external application (e.g., a different version of Adobe Acrobat, Adobe Flash Player, or another external application), then when that modified HTML page is processed (e.g., rendered) by the browser (e.g., Microsoft IE) that version of the external application is loaded into the same process (e.g., the same process executing the Microsoft IE browser in the instrumented VM environment). In this example, given that the 'new' object that was inserted into the DOM node tree has the same attribute(s) as that of the copied object, the content associated with the 'new' object (e.g., PDF file, Flash file, or other content) will be the same, and, as a result, that same content will be rendered by that different version of the external application (e.g., as the CLSID of a copied object was mapped to a different version of the external application for the 'new' object).

FIG. 4 is a flow diagram for enumerating objects embedded in a sample during dynamic malware analysis of a sample in an instrumented virtual machine environment in accordance with some embodiments. In one embodiment, objects embedded in a sample, such as a web page, are enumerated to facilitate the disclosed techniques for rendering an object using multiple versions of an application in a single process for dynamic malware analysis. Referring to process 400 of FIG. 4, the process starts at 402 by initiating a launcher program to start the process for enumerating objects in a sample during dynamic malware analysis of the sample in an instrumented virtual machine environment.

At 404, an initial system setup is performed to initialize an instrumented VM environment. In one embodiment, as an initial system setup for a VM image for dynamic malware testing, configuration changes are performed to modify a baseline VM image (e.g., to hot patch the baseline VM image to support additional versions of one or more external applications, such as to hot patch a Windows 7 OS image to include/support multiple versions of the Adobe Flash Player, such as versions 16 and 17, in addition to the Adobe Flash Player version 13 that was included/supported in that original VM image and/or multiple versions of another application, such as Adobe Acrobat). For example, modifying the baseline VM image can also include modifying the registry and copying executable files for each of the versions of the application (e.g., Adobe Flash Player versions 16 and 17) to be added to the VM image.

In an example implementation, modifying the baseline VM image includes adding a new class ID and a new type for each distinct version of the application (e.g., Adobe Flash Player versions 16 and 17) to the registry (e.g., CLSID in the Microsoft Windows OS registry). Also, executable versions for each distinct version of the application (e.g., Adobe Flash Player versions 16 and 17) can be copied onto the physical storage for the instrumented VM environment for the modified VM image (e.g., copy executable files (.ocx) for Flash Player versions 16 and 17). For example, adding a new class ID and a new type for each distinct version of the application (e.g., Adobe Flash Player versions 16 and 17, in addition to Adobe Flash Player version 13) and the executable files for each of these application versions facilitates testing Flash content (e.g., Flash files) using these distinct Adobe Flash Player versions as further described below.

In an example implementation, below is an example registry path for classid and for type (with example values).
For classid: HKEY_CLASSES_ROOT\CLSID\{00000300-0000-0000-C000-110000000046}
For type: HKEY_CLASSES_ROOT\MIME\Database\Content Type\application/x-shockwave-example In an example implementation, in order to allow for the loading of the object using different versions of the application into the same process, the initial setup can include modifying the physical file (e.g., implemented as a modification of the physical file of the application on disc or patching in memory the Flash Player executable file) to facilitate the co-rendering of the Flash content using different versions of the Adobe Flash Player (e.g., modifying the default CLSID of the Flash Object). As such, the VM instance that is preinstalled with Windows 7 and Adobe Flash Player version 13 is hot patched to include the respective executable files and new registry entries to support each of Adobe Flash Player versions 13, 16, and 17.

In another embodiment, the baseline VM image is preinstalled with multiple versions of the external applications (e.g., Adobe Flash Player, such as versions 13, 16, and 17 and/or multiple versions of another application, such as Adobe Acrobat).

After the initial system setup for the VM image for dynamic malware analysis, a web browser (e.g., Microsoft IE or another commercially available browser) is launched (e.g., executed in the instrumented VM environment) and a sample (e.g., URL or other content) is provided as input to the browser for dynamic testing of the sample as shown at 406. In one embodiment, a browser helper object (BHO) (e.g., a BHO library) is executed (e.g., loaded or installed as a plugin) by the browser prior to rendering the URL sample as further described below.

At 408, if the browser has not finished loading the page (e.g., the web page associated with the sample, such as the web page fetched by the browser based on the URL sample), then the process continues (e.g., keeps waiting until finish page loading) as shown at 410.

As shown at 412, after the browser has finished loading the page, enumerating objects and embed nodes from the DOM tree in the page (e.g., HTML page) is performed. In one embodiment, a browser helper object (BHO) (e.g., a BHO library) is executed (e.g., loaded or installed as a plugin) by the browser prior to rendering the URL sample, and the BHO includes an object enumerator component that processes the sample to enumerate each of the objects that can be rendered by the sample (e.g., embedded objects in the sample or associated with the sample, such as embedded objects in a resource associated with the sample, such as a link/URL to another resource that includes an embedded object, such as a Flash object, in which such objects are rendered using an external application that is different than the browser). In an example implementation, the BHO enumerates all of the objects of interest by identifying each of the objects of interest in the DOM nodes (e.g., automatically examining each of the HTML Inline Frame Elements (<iframe>) (iframe(s)) associated with the HTML page) to identify embedded objects to test using different versions of the external application (e.g., embedded Flash objects in this example), as further described below.

At 414, if an embedded object is determined to be an embedded Flash object, then processing proceeds to 418. Otherwise, no special action for embedded objects is performed as shown at 416.

At 418, retrieving the original object's attributes is performed. At 420, the original object's attributes are duplicated for creating/adding a 'new' object to test that same content (e.g., that same Flash content associated with the embedded Flash object) using a different version of the external application (e.g., a different version of the Adobe Flash application in this example), as further described below. In an example implementation, the same attributes associated with the object are duplicated but with different CLSID and TYPE values that were previously added to the registry (e.g., during the initial system setup 404). For example, the BHO can create a new element by calling the createElement method from the IHTMLDocument2 COM interface and then call put_innerHTML to put the new HTML code that will duplicate a 'new' object. After returning, it can call appendChild to enable the object by append it into the DOM tree.

At 422, the object is opened (e.g., played) with different versions of the application that are executed in the same process (i.e., executed within the same IE browser process). In an example implementation, for each embedded object of interest (e.g., embedded Flash objects in this example), the BHO duplicates the embedded object(s) in the DOM tree of the HTML page (e.g., with same attributes by different class ID and different type) to facilitate the browser calling the object(s) using different versions of the external application (e.g., Adobe Flash Player versions 13, 16, and 17) for rendering of the object(s) using the different versions of the external application in a single process of rendering the sample (e.g., HTML page). The disclosed techniques can be similarly performed for various external applications, such as Adobe Flash Player, Adobe Acrobat, Java, Microsoft Office, and/or various other applications (e.g., which each have their own registered (unique) class ID and type in the CLSID). In an example implementation, additional memory (e.g., RAM) may be allocated to the instrumented VM environment to support testing of multiple versions of the application using the above-described techniques (e.g., a Windows 7 VM image can be allocated 2.5 G memory for implementing the disclosed techniques).

Figure 5:
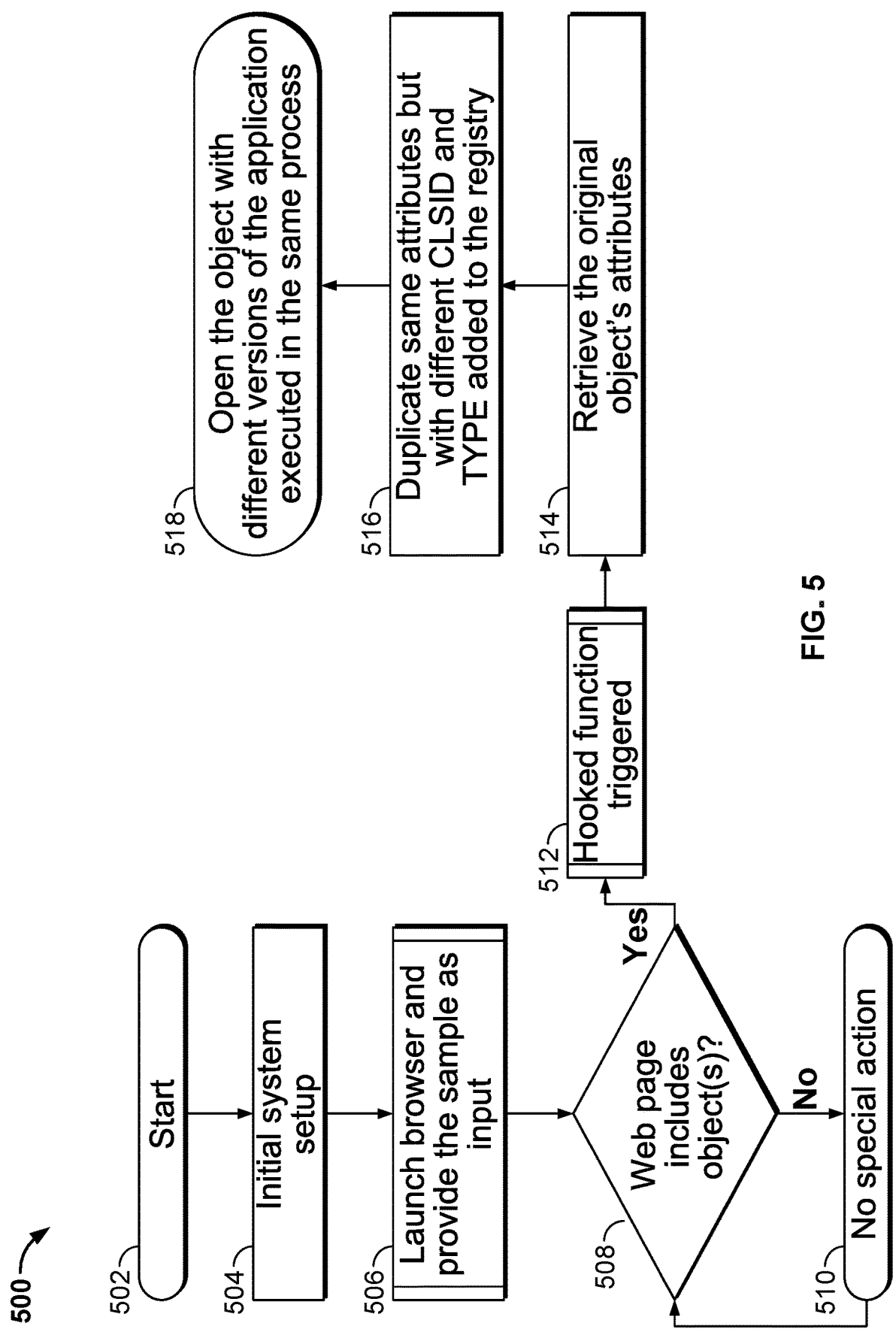
FIG. 5 is a flow diagram for identifying requests to get objects during dynamic malware analysis of a sample in an instrumented virtual machine environment in accordance with some embodiments.

In one embodiment, techniques for rendering an object using multiple versions of an application in a single process for dynamic malware analysis include identifying requests to get objects (e.g., coded in a web page using the first mechanism and/or second mechanism) as shown in FIG. 5 and further described in the below section entitled: (2) identifying requests to get objects by hooking/intercepting function calls.

(2) Identifying Requests to Get Objects by Intercepting Function Calls

FIG. 5 is a flow diagram for identifying requests to get objects during dynamic malware analysis of a sample in an instrumented virtual machine environment in accordance with some embodiments. In one embodiment, requests to get objects are identified by intercepting the requests (e.g., hooking the function calls) to get objects in a web page to facilitate the disclosed techniques for rendering an object using multiple versions of an application in a single process for dynamic malware analysis. Referring to process 500 of FIG. 5, the process starts at 502 by initiating a launcher program to start the process for identifying requests to get objects during dynamic malware analysis of a sample in an instrumented virtual machine environment.

At 504, an initial system setup is performed to initialize an instrumented VM environment. In one embodiment, the initial system setup is performed as similarly described above with respect to stage 404 of FIG. 4.

After the initial system setup for the VM image for dynamic malware analysis, a web browser (e.g., Microsoft IE or another commercially available browser) is launched (e.g., executed in the instrumented VM environment) and a sample (e.g., URL or other content) is provided as input to the browser for dynamic testing of the sample as shown at 506. In one embodiment, a browser helper object (BHO) (e.g., a BHO library) is executed (e.g., loaded or installed as a plugin) by the browser prior to rendering the URL sample as further described below.

At 508, if the web page includes an embedded object of interest (e.g., an embedded Flash object or another object of interest), then processing proceeds to 512. Otherwise, no special action for embedded objects is performed as shown at 510.

At 512, a hooked function is triggered. In an example implementation, the BHO includes a function interceptor component that can intercept/hook one or more function calls (e.g., function calls executed by the web browser when rendering an HTML page, such as the sample, such as a function call to render an embedded object, such as a DllGetClassObject function call for a Flash object, in which such objects are rendered using an external application that is different than the browser). For example, the function interceptor component can be configured to intercept/hook a DllGetClassObject function to intercept function calls to embedded Flash objects, such as further described below.

In an example implementation, below are example hooked functions in Flash OCX that can be implemented by the function interceptor component of the BHO.

a. CreateInstance
    CreateInstance function in IClassFactory interface after call CoGetClassObject or (DllGetClassObject exported from the flash ocx file), the classid in pass-in parameters to DllGetClassObject is "D27CDB6E-AE6D-11cf-96B8-444553540000".
  b. Put_Movie( ) in IShockwaveFlash Interface which is returned by CreateInstanceO function.

At 514, retrieving the original object's attributes is performed. At 516, the original object's attributes are duplicated for creating/adding a 'new' object to test that same content (e.g., that same Flash content associated with the embedded Flash object) using a different version of the external application (e.g., a different version of the Adobe Flash application in this example), as further described below. In an example implementation, the same attributes associated with the object are duplicated but with different CLSID and TYPE values that were previously added to the registry (e.g., during the initial system setup 504), such as similarly described above with respect to stage 420 of FIG. 4.

At 518, the object is opened (e.g., played) with different versions of the application that are executed in the same process (i.e., executed within the same IE browser process). In one embodiment, the object is opened (e.g., played) with different versions of the application that are executed in the same process, performed as similarly described above with respect to stage 422 of FIG. 4.

Example Components of an Instrumented VM Environment for Dynamic Malware Analysis of Samples As similarly described above, various improved techniques for performing dynamic malware analysis of a sample (e.g., a URL sample) using a browser executed in an instrumented VM environment are disclosed. For example, techniques described herein can be used to provide an enhanced dynamic malware analysis (e.g., more effective malware analysis) of samples using a browser executed in an instrumented VM environment. In addition, techniques described herein can be used to provide more efficient dynamic malware analysis of samples using a browser executed in an instrumented VM environment. An example set of components of an instrumented VM environment for performing dynamic malware analysis of samples using the disclosed techniques will now be described with respect to FIG. 6.

Figure 6:
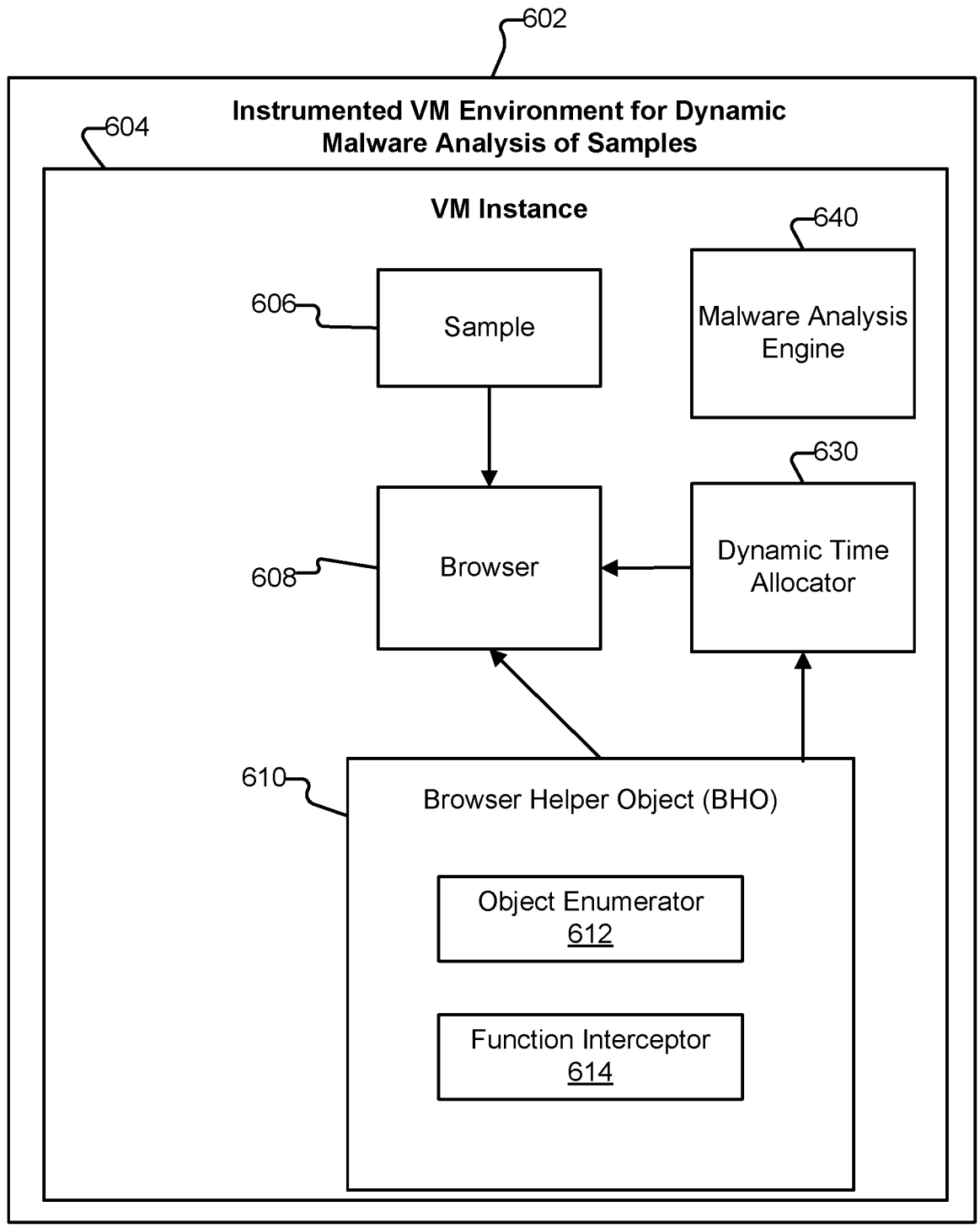
FIG. 6 is a component diagram of an instrumented virtual machine environment for performing dynamic malware analysis of samples in accordance with some embodiments.

FIG. 6 is a component diagram of an instrumented virtual machine environment for performing dynamic malware analysis of samples in accordance with some embodiments. In an example implementation, cloud security service 122 including malware analysis system/VM server 124 and VM instances 126 and 128 of FIG. 1 can be implemented using the components as shown in FIG. 6 as further described below. In another example implementation, malware analysis system 132 including VM server 112 and VM instances 114 and 116 of FIG. 1 can be implemented using the components as shown in FIG. 6 as further described below.

In some cases, to efficiently and effectively determine that a sample is malicious using an instrumented VM environment can be time consuming (e.g., requiring one to five minutes or longer in a VM instance executing in the instrumented VM environment, depending on the hardware/software embodiment and the sample, such as a URL sample).

However, existing approaches typically allocate a default, fixed period of time for malware analysis of each sample. For example, such approaches may allocate one minute (e.g., or some other default, fixed period of time) for malware analysis of each sample regardless of content for a given sample. As a result, such approaches waste computing resources and also waste the time of the instrumented VM environment to perform such analysis on samples that would require less time. Also, such approaches can fail to allocate sufficient time to detect malware associated with samples that are more complicated (e.g., in which certain malware content, such as malware Java Script active content in a web page, embedded Flash/PDF/Java/other objects, or other suspicious or malicious content/actions, would not be detected within the default, fixed one minute period of time for performing malware analysis on the web page in the instrumented VM environment). As such, existing approaches are inefficient as such waste time for URL samples that actually require less than the fixed amount of time. Moreover, existing approaches are ineffective as such may not allow sufficient time for a given (e.g., more complicated) URL sample to perform malware analysis to detect malware associated with the URL.

In addition, a cloud security service can receive a significant number of samples per day for malware analysis (e.g., thousands to millions of URL/other samples per day). Moreover, given that samples can often be associated with resources (e.g., web pages or other resources) that can include active/executable content (e.g., Java Script or other active/executable content) that can display and dynamically generate content for display/execution during rendering by a browser, this can also create technical challenges for efficiently and effectively performing malware analysis of such samples using an instrumented VM environment. For example, such active/executable content can make it difficult to determine when the rendering of a sample (e.g., an HTML web page) is completed (e.g., when to terminate the time allocated for malware analysis of the sample using the instrumented VM environment, such that computing resources of the instrumented VM environment can be used to perform malware analysis of another sample).

In one embodiment, dynamic malware analysis of a sample (e.g., a URL sample) using a browser executed in an instrumented VM environment is enhanced by determining a sufficient and/or more accurate period of time to allocate for dynamic malware analysis of the sample in the instrumented VM environment. In an example implementation, various system (e.g., operating system) and browser events can be detected (e.g., intercepted) in the instrumented VM environment that can facilitate various techniques as further described below. For example, various functions and/or events can be detected (e.g., registered for notifications using message hooks) in the instrumented VM environment. Java Script and/or browser related events can be enumerated on Java Script HTML Document Object Model (DOM) nodes (e.g., by accessing a structure in system memory). Based on the events associated with a given sample, a time can be dynamically determined for how long to allocate to the dynamic malware analysis of the sample in the instrumented VM environment. As another example, an event can be intercepted (e.g., registered for notifications using message hooks), such as an onload event, which can facilitate a notification upon a completion of the onload event. Using these example approaches and various other approaches further described below, the content (e.g., HTML source code, Java Script code, and/or other content, including dynamic content) of a sample (e.g., web page) can be identified and recorded.

In one embodiment, a period of time allocated for analysis of a sample is dynamically determined, such that more time or less time can be allocated based on characteristics associated with the sample. These techniques can reduce the amount of time used for performing dynamic malware analysis of samples in the instrumented VM environment, which therefore facilitates a more efficient using of computing resources of the instrumented VM environment for performing efficient dynamic malware analysis. Also, these techniques can facilitate detection of malware samples that would otherwise evade detection using existing approaches to malware analysis, thereby providing an enhanced dynamic malware detection of samples.

The disclosed techniques for providing an efficient and enhanced analysis of samples using an instrumented virtual machine (VM) environment can be implemented using the example instrumented VM environment for performing dynamic malware analysis of samples as shown in FIG. 6 as further described below.

As shown in FIG. 6, an instrumented VM environment for dynamic malware analysis of samples 602 includes one or more VM instances, such as a VM instance 604. In various embodiments, instrumented VM environment 602 is executed on VM server 112 of malware analysis system 132 and/or on VM server 124 of cloud security service 122 as shown in FIG. 1. As similarly described above with respect to FIG. 1, one or more samples can be provided to the instrumented VM environment for dynamic malware analysis of the samples. In this example, a sample 606 is provided to a browser 608 (e.g., Microsoft Internet Explorer® or another web browser) executed in VM instance 604. A browser helper object (BHO) 610 is loaded by browser 608 before the sample is processed (e.g., before the URL of the sample is retrieved and rendered) by browser 608. In an example implementation, BHO 610 is a dynamically loaded library (DLL) module that is implemented as a standard plugin module for the Microsoft Internet Explorer Browser® (e.g., or another commercially available web browser) to perform added functionality. In this example, BHO 610 includes components for performing various functions as further described below.

In one embodiment, BHO 610 includes an object enumerator component 612. In an example implementation, object enumerator 612 can enumerate each of the embedded objects associated with a sample that are of interest as similarly described above with respect to FIG. 4 (e.g., processing performed at stages 412 through 422 of FIG. 4 as described above).

In one embodiment, BHO 610 also includes a function interceptor component 614. In an example implementation, function interceptor 614 can intercept/hook each of the functions associated with a sample that are of interest as similarly described above with respect to FIG. 5 (e.g., processing performed at stages 512 through 518 of FIG. 5 as described above).

In one embodiment, BHO 610 also includes an event enumerator component (not shown) that is executed to enumerate the Java Script and/or browser related events associated with a sample (e.g., URL sample). For example, the events can be enumerated on Java Script HTML Document Object Model (DOM) nodes (e.g., by accessing a structure in system memory).

As also shown in FIG. 6, a dynamic time allocator component 630 is also provided. For example, the dynamic time allocator can dynamically select a period of time allocated for dynamic malware analysis of a given sample based on content of the sample. During the allocated period of time for dynamic malware analysis, malware analysis engine 640 performs various malware analysis techniques to determine whether the sample is associated with malware. For example, malware analysis engine 640 can perform various heuristic and/or other malware detection techniques, based on various kernel-level and/or user-level hooks to monitor behaviors of the browser during execution/rendering of the sample in the instrumented VM environment, such as described herein and as well known by those of ordinary skill in the art.

Whenever cloud security service 122 is described as performing a task, a single component, a subset of components, or all components of cloud security service 122 may cooperate to perform the task. Similarly, whenever a component of cloud security service 122 is described as performing a task, a subcomponent may perform the task and/or the component may perform the task in conjunction with other components. Similarly, additional logical components/ features can be added to cloud security service 122 as applicable.

Figure 7:
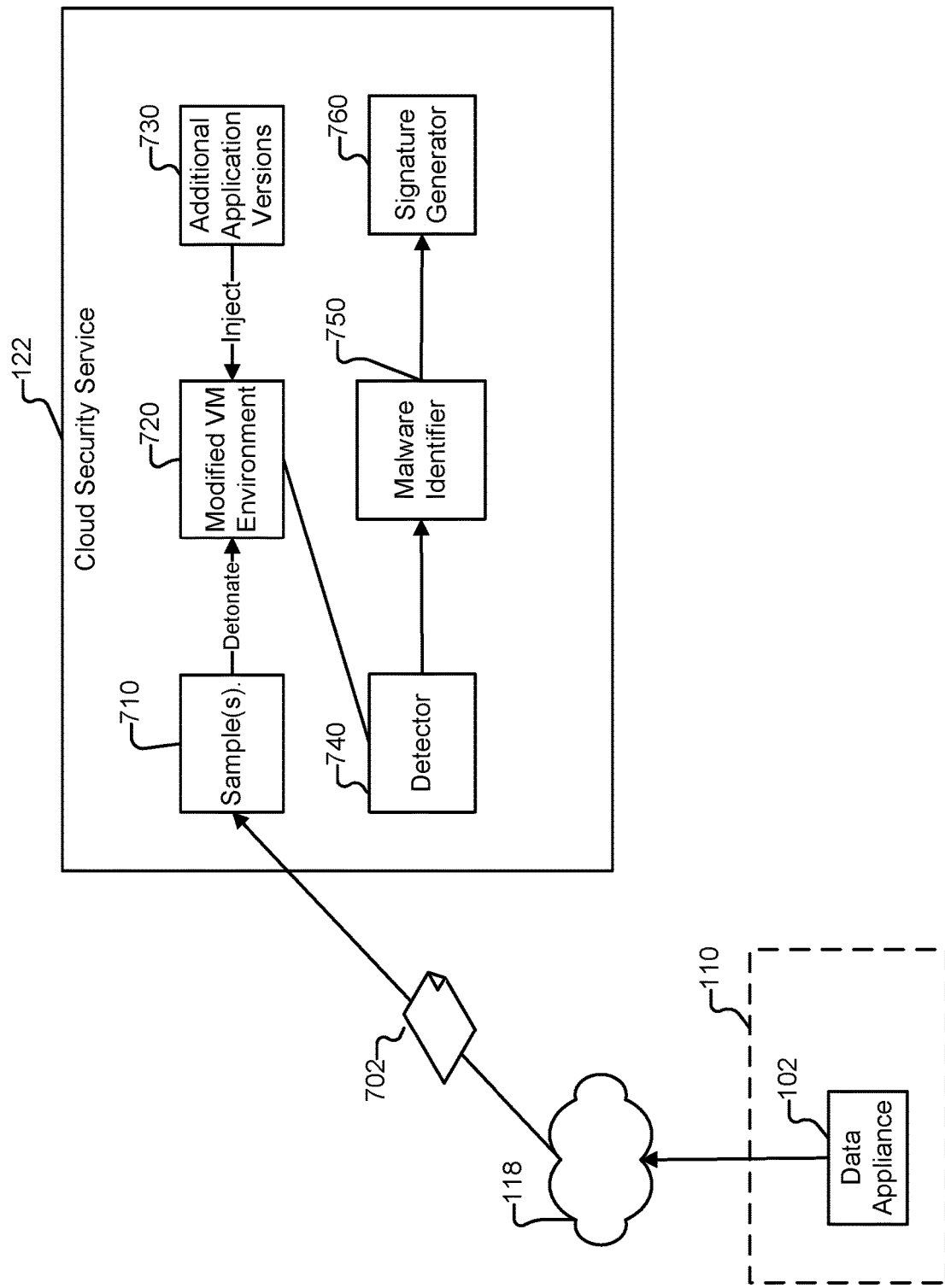
FIG. 7 is a component diagram of a system that can perform the disclosed techniques for rendering an object using multiple versions of an application in a single process for dynamic malware analysis in accordance with some embodiments.

FIG. 7 is a component diagram of a system that can perform the disclosed techniques for rendering an object using multiple versions of an application in a single process for dynamic malware analysis in accordance with some embodiments. In an example implementation, cloud security service 122 including malware analysis system/VM server 124 and VM instances 126 and 128 of FIG. 1 can be implemented using the components as shown in FIG. 7 as further described below.

At 710, a sample 702 is received and stored in a sample data store 710 at cloud security service 122 from a data appliance 102 for enterprise network 110 via Internet 118. Different versions of an external application (e.g., Adobe Flash Player versions 13, 16, and 17 or another application/ versions) as shown at 730 are injected (e.g., hot patched) in a clean, virtual machine (VM) environment to generate a modified VM environment as shown at 720 as similarly described above (e.g., as similarly described above, such as described above with respect to stage 404 of FIG. 4). The sample stored at 710 is then detonated in the modified VM environment 720 and its behaviors during an automated malware analysis (e.g., using malware analysis system/VM server 124) are monitored using a malware/suspicious behavior detector component 740, such as similarly described above. A malware identifier component 750 then determines whether the sample is deemed to be malware based on results of the detector component for the dynamic malware analysis, such as based on various heuristic and/or other techniques as similarly described above. At 760, a signature is generated using an automated signature generation component (e.g., to extract one or more unique strings or other attributes associated with the malware sample to generate the signature for identifying that malware). For example, the signature can be distributed to subscribing data appliances as similarly described above.

Additional example processes for the disclosed techniques for rendering an object using multiple versions of an application in a single process for dynamic malware analysis will now be described.

Figure 8:
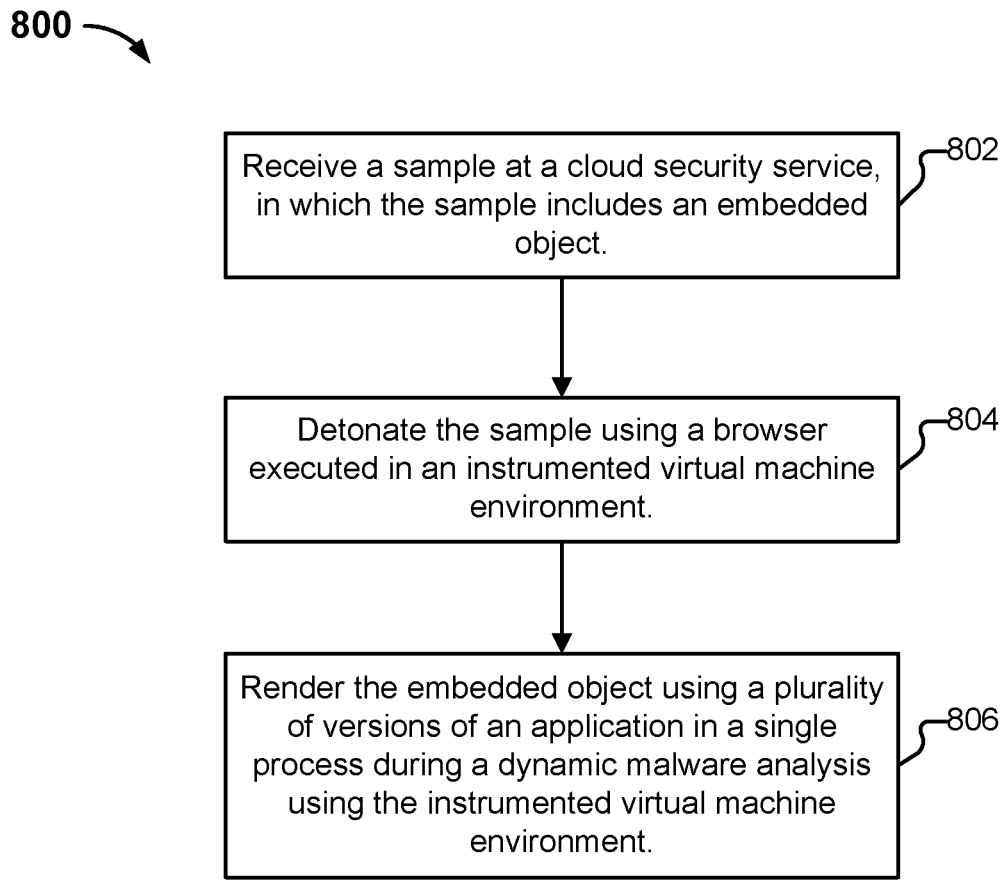
FIG. 8 is a flow diagram of a process for rendering an object using multiple versions of an application in a single process for dynamic malware analysis in accordance with some embodiments.

Processes for Rendering an Object Using Multiple Versions of an Application in a Single Process for Dynamic Malware Analysis FIG. 8 is a flow diagram of a process for rendering an object using multiple versions of an application in a single process for dynamic malware analysis in accordance with some embodiments. In some embodiments, a process 800 as shown in FIG. 8 is performed by the platform and techniques as similarly described above including the embodiments described above with respect to FIGS. 1-7. In one embodiment, process 800 is performed by cloud security service 122 as described above with respect to FIGS. 1 and 7.

The process begins at 802 when a sample is received at a cloud security service, in which the sample includes an embedded object. For example, a sample can be received from a subscribing data appliance (e.g., a security device that has a subscription to the cloud security service) as similarly described above with respect to FIGS. 1 and 7.

At 804, the sample is detonated using a browser executed in an instrumented virtual machine environment. For example, the sample can be provided as input to the browser so that the sample can be opened in the instrumented virtual machine environment to facilitate a dynamic malware analysis of the sample to monitor activities/behaviors of the sample, such as for a predetermined period of time as similarly described above.

At 806, the embedded object is rendered using a plurality of versions of an application in a single process during a dynamic malware analysis using the instrumented virtual machine environment. For example, a sample that provides a URL/link to a web page that includes an embedded object (e.g., for Flash content or other content) can be rendered using a browser and multiple different versions of an external application (e.g., Adobe Flash Player for playing Flash content or a different application for opening/executing other types of content) in a single process during the dynamic malware analysis in the instrumented virtual machine environment.

Figure 9:
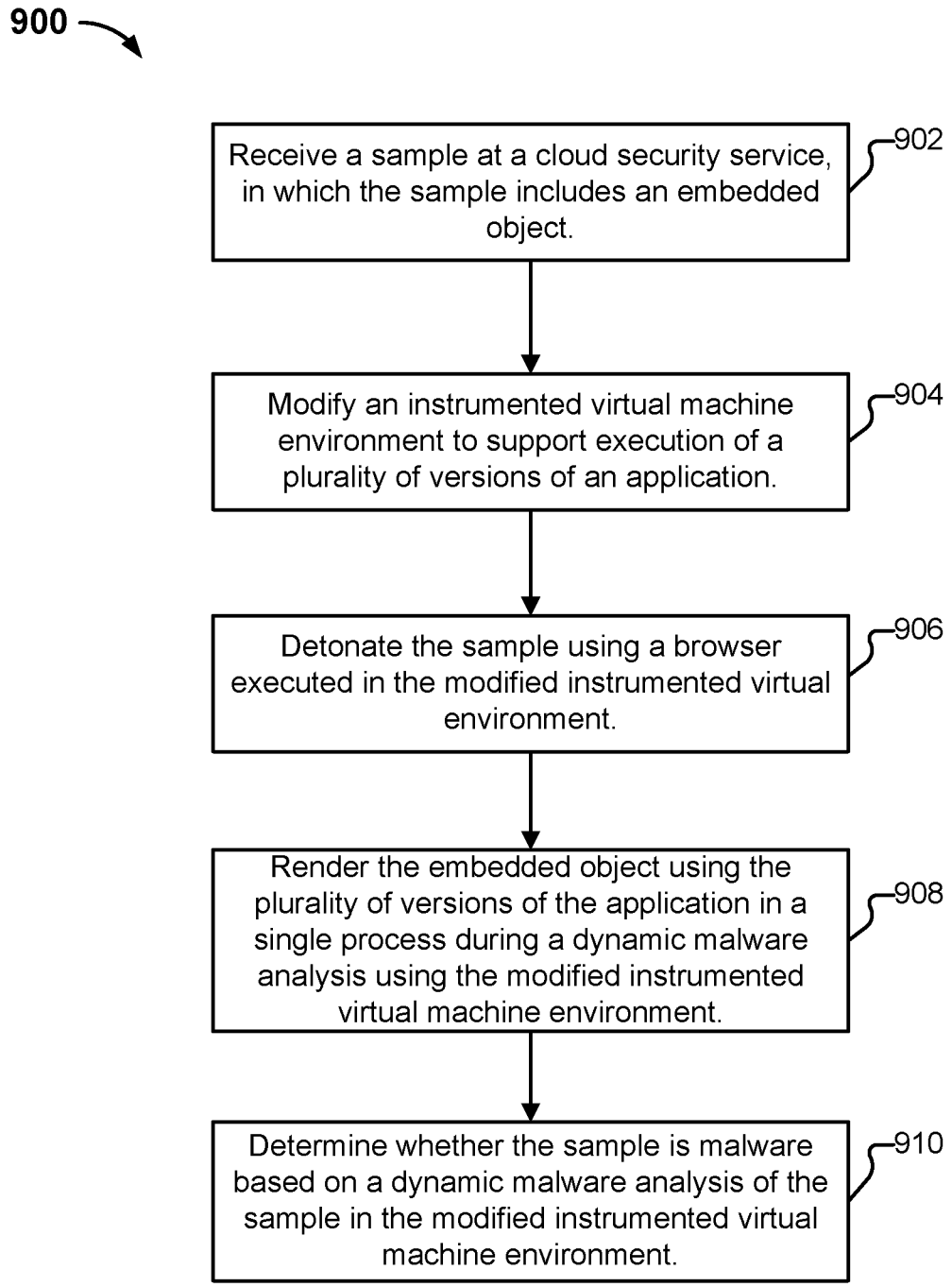
FIG. 9 is another flow diagram of a process for rendering an object using multiple versions of an application in a single process for dynamic malware analysis in accordance with some embodiments.

FIG. 9 is a flow diagram of a process for rendering an object using multiple versions of an application in a single process for dynamic malware analysis in accordance with some embodiments. In some embodiments, a process 900 as shown in FIG. 9 is performed by the platform and techniques as similarly described above including the embodiments described above with respect to FIGS. 1-7. In one embodiment, process 900 is performed by cloud security service 122 as described above with respect to FIGS. 1 and 7.

The process begins at 902 when a sample is received at a cloud security service, in which the sample includes an embedded object. For example, a sample can be received from a subscribing data appliance (e.g., a security device that has a subscription to the cloud security service) as similarly described above with respect to FIGS. 1 and 7.

At 904, an instrumented virtual machine environment is modified to support execution of a plurality of versions of an application. For example, modifying the instrumented virtual machine environment can include hot patching a baseline VM image (e.g., including adding a new class id and a type for each of the added plurality of versions of the application in a registry; and/or modifying a physical executable file for each of the plurality of versions of the application on disc or patch in memory to facilitate co-rendering of the embedded object using the plurality of versions of the application) to support additional versions of one or more external applications, such as described above with respect to FIG. 4.

At 906, the sample is detonated using a browser executed in the modified instrumented virtual machine environment. For example, the sample can be provided as input to the browser so that the sample can be opened in the modified instrumented virtual machine environment to facilitate a dynamic malware analysis of the sample to monitor activities/behaviors of the sample, such as for a predetermined period of time as similarly described above.

At 908, the embedded object is rendered using a plurality of versions of an application in a single process during a dynamic malware analysis using the modified instrumented virtual machine environment. For example, a sample that provides a URL/link to a web page that includes an embedded object (e.g., for Flash content or other content) can be rendered using a browser and multiple different versions of an external application (e.g., Adobe Flash Player for playing Flash content or a different application for opening/executing other types of content) in a single process during the dynamic malware analysis in the modified instrumented virtual machine environment.

At 910, whether the sample is malware is determined based on a dynamic analysis of the sample in the modified instrumented virtual machine environment. For example, various heuristic techniques can be applied to determine whether the sample is associated with malware as similarly described above. In some cases, a signature can also be automatically generated if the sample is determined to be malware (e.g., a URL signature, a file-based signature, or another type of signature) as also similarly described above.

Figure 10:
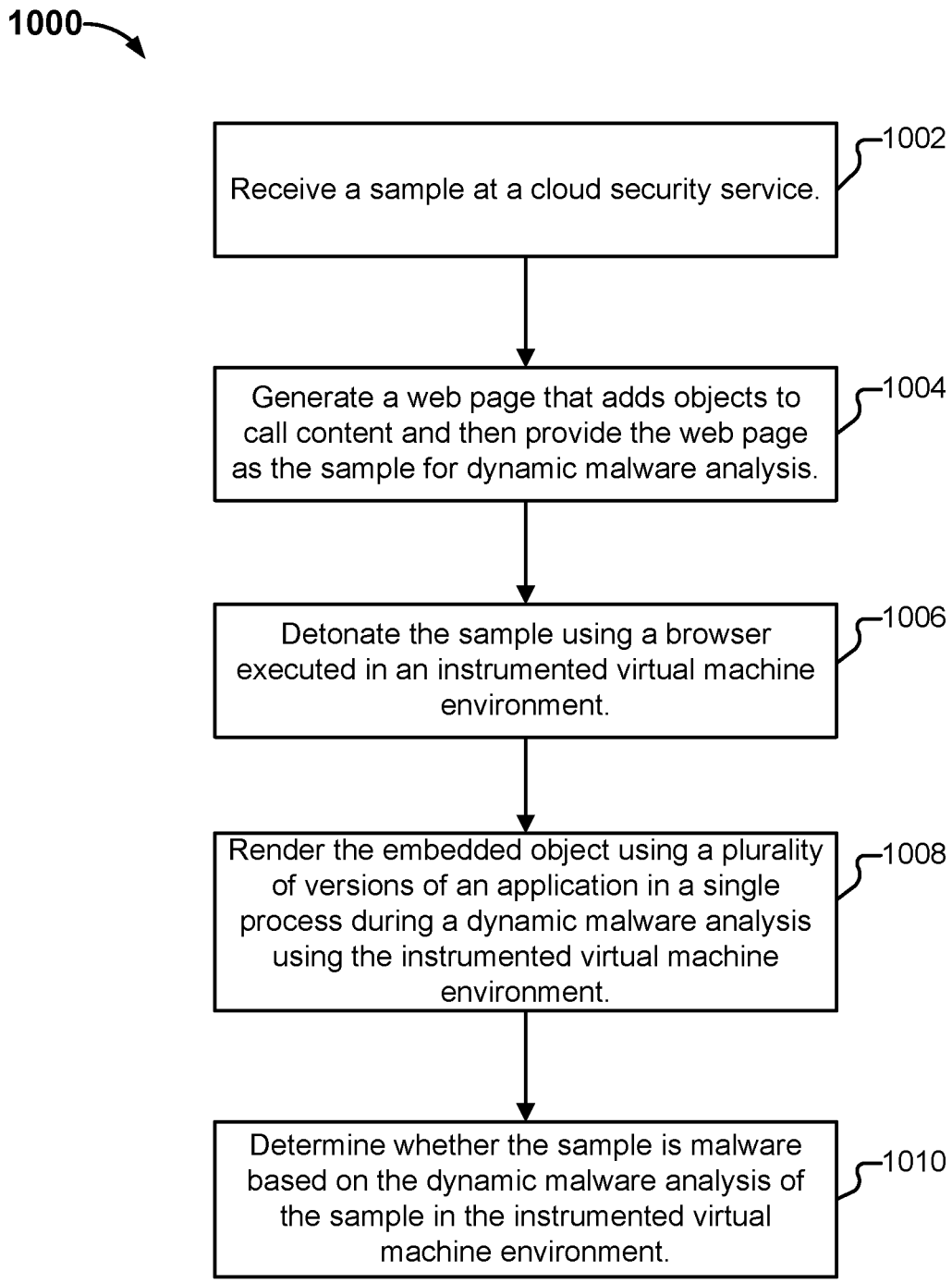
FIG. 10 is another flow diagram of a process for rendering an object using multiple versions of an application in a single process for dynamic malware analysis in accordance with some embodiments.

FIG. 10 is another flow diagram of a process for rendering an object using multiple versions of an application in a single process for dynamic malware analysis in accordance with some embodiments. In some embodiments, a process 1000 as shown in FIG. 10 is performed by the platform and techniques as similarly described above including the embodiments described above with respect to FIGS. 1-7. In one embodiment, process 1000 is performed by cloud security service 122 as described above with respect to FIGS. 1 and 7.

The process begins at 1002 when a sample is received at a cloud security service. For example, a sample can be received from a subscribing data appliance (e.g., a security device that has a subscription to the cloud security service) as similarly described above with respect to FIGS. 1 and 7. In this example, the sample includes content, such as a Flash file or other content (e.g., files), rather than a URL or web/HTML page/file. In such cases, the disclosed techniques can be similarly applied by generating an HTML file that includes an embedded object for that content, such as further described below.

At 1004, a web page is generated that adds (e.g., embeds) objects to call content of the sample (e.g., a Flash file(s), a PDF file(s), and/or other content) in a template web page (e.g., HTML file), and the web page is then provided as the sample for dynamic malware analysis. For example, a template web page can be used to embed objects for calling such content provided in the original sample, such as similarly described above.

At 1006, the sample is detonated using a browser executed in an instrumented virtual machine environment. For example, the sample can be provided as input to the browser so that the sample can be opened in the instrumented virtual machine environment to facilitate a dynamic malware analysis of the sample to monitor activities/behaviors of the sample, such as for a predetermined period of time as similarly described above.

At 1008, the embedded object is rendered using a plurality of versions of an application in a single process during a dynamic malware analysis using the instrumented virtual machine environment. For example, a sample that provides a URL/link to a web page that includes an embedded object (e.g., for Flash content or other content) can be rendered using a browser and multiple different versions of an external application (e.g., Adobe Flash Player for playing Flash content or a different application for opening/executing other types of content) in a single process during the dynamic malware analysis in the instrumented virtual machine environment.

At 1010, whether the sample is malware is determined based on the dynamic malware analysis of the sample in the instrumented virtual machine environment. For example, various heuristic techniques can be applied to determine whether the sample is associated with malware as similarly described above. In some cases, a signature can also be automatically generated if the sample is determined to be malware (e.g., a URL signature, a file-based signature, or another type of signature) as also similarly described above.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a processor configured to:
   receive a sample at a cloud security service for detonating in an instrumented virtual machine environment, wherein the sample includes an embedded object;
   modify the instrumented virtual machine environment to support execution of a plurality of versions of an application, wherein modifying the instrumented virtual machine environment to support execution of the plurality of versions of the application includes hot patching a baseline virtual machine image or modifying a physical executable file for each of the plurality of versions of the application;
   launch a browser library, a browser plugin, or a browser helper object (BHO) in a single process executed in the instrumented virtual machine environment, wherein the browser library, the browser plugin, or the BHO is loaded by the browser prior to rendering the sample, and wherein the browser library, the browser plugin, or the BHO facilitates rendering the embedded object using the plurality of versions of the application in the single process during a dynamic malware analysis using the instrumented virtual machine environment;
   detonate the sample using a browser executed in the instrumented virtual machine environment; and
   render the embedded object included in the sample using the plurality of versions of the application in a single process for executing the browser during a dynamic malware analysis using the instrumented virtual machine environment, wherein the application is an external application that is called by the browser to render the embedded object included in the sample, wherein the embedded object is rendered using the external application executed in the instrumented virtual machine environment, and wherein the external application is different than the browser and is capable of rendering the embedded object; and
   a memory coupled to the processor and configured to provide the processor with instructions.

2. The system recited in claim 1, wherein the sample is received from a security device that has a subscription to the cloud security service.

3. The system recited in claim 1, wherein the sample is rendered using the browser executed in the instrumented virtual machine environment and monitored using the instrumented virtual machine environment for at least a period of time allocated for performing the dynamic malware analysis of the sample or until malicious behavior is detected.

4. The system recited in claim 1, wherein the sample includes a Uniform Resource Identifier (URI) that includes a reference to the embedded object that can be retrieved and rendered using the external application executed in the instrumented virtual machine environment.

5. The system recited in claim 1, wherein the sample includes a Uniform Resource Identifier (URI) that includes a reference to the embedded object that can be retrieved and rendered using the external application executed in the instrumented virtual machine environment, and wherein the embedded object includes dynamic content.

6. The system recited in claim 1, wherein the sample includes a Uniform Resource Identifier (URI) that includes a reference to the embedded object that can be retrieved and rendered using the external application executed in the instrumented virtual machine environment, and wherein the embedded object includes content that includes Flash content or PDF content.

7. The system recited in claim 1, wherein modifying the instrumented virtual machine environment to support execution of the plurality of versions of the application comprises one or more of the following to facilitate co-rendering of the embedded object using the plurality of versions of the application:
hot patch a baseline virtual machine image to add a new class identifier (ID) and a type for each of the plurality of versions of the application in a registry; and
modify a physical executable file for each of the plurality of versions of the application.

8. The system recited in claim 1, wherein the processor is further configured to:
determine whether the sample is associated with malware based on analysis of the sample during a period of time allocated for performing the dynamic malware analysis of the sample using the single process executed in the instrumented virtual machine environment; and
automatically generate a signature for the sample if the sample is determined to be malware.

9. A method, comprising:
receiving a sample at a cloud security service for detonating in an instrumented virtual machine environment, wherein the sample includes an embedded object;
modifying the instrumented virtual machine environment to support execution of a plurality of versions of an application, wherein modifying the instrumented virtual machine environment to support execution of the plurality of versions of the application includes hot patching a baseline virtual machine image or modifying a physical executable file for each of the plurality of versions of the application;
launching a browser library, a browser plugin, or a browser helper object (BHO) in a single process executed in the instrumented virtual machine environment, wherein the browser library, the browser plugin, or the BHO is loaded by the browser prior to rendering the sample, and wherein the browser library, the browser plugin, or the BHO facilitates rendering the embedded object using the plurality of versions of the application in the single process during a dynamic malware analysis using the instrumented virtual machine environment;
detonating the sample using a browser executed in the instrumented virtual machine environment; and rendering the embedded object included in the sample using the plurality of versions of the application in a single process for executing the browser during a dynamic malware analysis using the instrumented virtual machine environment, wherein the application is an external application that is called by the browser to render the embedded object included in the sample, wherein the embedded object is rendered using the external application executed in the instrumented virtual machine environment, and wherein the external application is different than the browser and is capable of rendering the embedded object.

10. The method of claim 9, wherein the sample is received from a security device that has a subscription to the cloud security service.

11. The method of claim 9, wherein the sample is rendered using the browser executed in the instrumented virtual machine environment and monitored using the instrumented virtual machine environment for at least a period of time allocated for performing the dynamic malware analysis of the sample or until malicious behavior is detected.

12. The method of claim 9, wherein the sample includes a Uniform Resource Identifier (URI) that includes a reference to the embedded object that can be retrieved and rendered using the external application executed in the instrumented virtual machine environment.

13. The method of claim 9, wherein the sample includes a Uniform Resource Identifier (URI) that includes a reference to the embedded object that can be retrieved and rendered using the external application executed in the instrumented virtual machine environment, and wherein the embedded object includes dynamic content.

14. The method of claim 9, wherein the sample includes a Uniform Resource Identifier (URI) that includes a reference to the embedded object that can be retrieved and rendered using the external application executed in the instrumented virtual machine environment, and wherein the embedded object includes content that includes Flash content or PDF content.

15. The method of claim 9, wherein modifying the instrumented virtual machine environment to support execution of the plurality of versions of the application comprises one or more of the following to facilitate co-rendering of the embedded object using the plurality of versions of the application:
hot patching a baseline virtual machine image to add a new class identifier (ID) and a type for each of the plurality of versions of the application in a registry; and
modifying a physical executable file for each of the plurality of versions of the application.

16. The method of claim 9, further comprising:
determining whether the sample is associated with malware based on analysis of the sample during a period of time allocated for performing the dynamic malware analysis of the sample using the single process executed in the instrumented virtual machine environment; and
automatically generating a signature for the sample if the sample is determined to be malware.

17. A computer program product, the computer program product being embodied in a non-transitory, tangible computer readable storage medium and comprising computer instructions for:
receiving a sample at a cloud security service for detonating in an instrumented virtual machine environment, wherein the sample includes an embedded object;

modifying the instrumented virtual machine environment to support execution of a plurality of versions of an application, wherein modifying the instrumented virtual machine environment to support execution of the plurality of versions of the application includes hot patching a baseline virtual machine image or modifying a physical executable file for each of the plurality of versions of the application;

launching a browser library, a browser plugin, or a browser helper object (BHO) in a single process executed in the instrumented virtual machine environment, wherein the browser library, the browser plugin, or the BHO is loaded by the browser prior to rendering the sample, and wherein the browser library, the browser plugin, or the BHO facilitates rendering the embedded object using the plurality of versions of the application in the single process during a dynamic malware analysis using the instrumented virtual machine environment;

detonating the sample using a browser executed in the instrumented virtual machine environment; and rendering the embedded object included in the sample using the plurality of versions of the application in a single process for executing the browser during a dynamic malware analysis using the instrumented virtual machine environment, wherein the application is an external application that is called by the browser to render the embedded object included in the sample, wherein the embedded object is rendered using the external application executed in the instrumented virtual machine environment, and wherein the external application is different than the browser and is capable of rendering the embedded object.

18. The computer program product recited in claim 17, wherein the sample includes a Uniform Resource Identifier (URI) that includes a reference to the embedded object that can be retrieved and rendered using the external application executed in the instrumented virtual machine environment, and wherein the embedded object includes content that includes dynamic content, Flash content, or PDF content.

19. The computer program product recited in claim 17, wherein modifying the instrumented virtual machine environment to support execution of the plurality of versions of the application comprises one or more of the following to facilitate co-rendering of the embedded object using the plurality of versions of the application:

hot patching a baseline virtual machine image to add a new class identifier (ID) and a type for each of the plurality of versions of the application in a registry; and modifying a physical executable file for each of the plurality of versions of the application.

20. The computer program product recited in claim 17, further comprising computer instructions for:

determining whether the sample is associated with malware based on analysis of the sample during a period of time allocated for performing the dynamic malware analysis of the sample using the single process executed in the instrumented virtual machine environment; and automatically generating a signature for the sample if the sample is determined to be malware.

* * * * *